United States Patent
Ono et al.

(10) Patent No.: US 12,320,756 B2
(45) Date of Patent: Jun. 3, 2025

(54) SURFACE-DEFECT DETECTING METHOD, SURFACE-DEFECT DETECTING APPARATUS, STEEL-MATERIAL MANUFACTURING METHOD, STEEL-MATERIAL QUALITY MANAGEMENT METHOD, STEEL-MATERIAL MANUFACTURING FACILITY, SURFACE-DEFECT DETERMINATION MODEL GENERATING METHOD, AND SURFACE-DEFECT DETERMINATION MODEL

(71) Applicant: JFE STEEL CORPORATION, Tokyo (JP)

(72) Inventors: Hiroaki Ono, Tokyo (JP); Masami Tate, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 766 days.

(21) Appl. No.: 17/297,516

(22) PCT Filed: Nov. 8, 2019

(86) PCT No.: PCT/JP2019/043930
§ 371 (c)(1),
(2) Date: May 27, 2021

(87) PCT Pub. No.: WO2020/110667
PCT Pub. Date: Jun. 4, 2020

(65) Prior Publication Data
US 2022/0011241 A1 Jan. 13, 2022

(30) Foreign Application Priority Data
Nov. 30, 2018 (JP) ................................ 2018-224403

(51) Int. Cl.
*G01N 21/89* (2006.01)
*G01N 21/88* (2006.01)

(52) U.S. Cl.
CPC ..... *G01N 21/8914* (2013.01); *G01N 21/8851* (2013.01); *G01N 2021/8918* (2013.01)

(58) Field of Classification Search
CPC ............. G01N 21/892; G01N 21/8851; G01N 21/8914; G01N 2021/8854;
(Continued)

(56) References Cited

U.S. PATENT DOCUMENTS 4,162,126 A * 7/1979 Nakagawa ........... G01N 21/952
250/559.46
5,293,538 A * 3/1994 Iwata ................. G01N 21/8806
356/239.1

(Continued)

FOREIGN PATENT DOCUMENTS

CN 101034069 A 9/2007
CN 102435618 A 5/2012
(Continued)

OTHER PUBLICATIONS

Funada Takeshi "Method for Detecting Specific Defect, and System and Program for Detecting Specific Defect", Nov. 1, 2012, JP 2012211773A (Year: 2012).*
(Continued)

*Primary Examiner* — Sang H Nguyen
(74) *Attorney, Agent, or Firm* — Oliff PLC

(57) ABSTRACT

A surface-defect detecting method of optically detecting a surface defect of a steel material, the method including: an irradiation step of irradiating an examination target part with illumination light beams from different directions by using two or more distinguishable light sources; and a detection step of detecting a surface defect in the examination target
(Continued)

part based on the degree of overlapping of bright portions extracted from two or more images formed by reflected light beams of the illumination light beams.

22 Claims, 19 Drawing Sheets

(58) Field of Classification Search
CPC ... G01N 2021/8924; G01N 2021/8887; G01N 2021/8864; G01N 2021/8918; G01N 2021/8867
See application file for complete search history.

(56) References Cited

U.S. PATENT DOCUMENTS

| | | | |
|---|---|---|---|
| 6,327,374 B1* | 12/2001 | Piironen | G01N 21/57 |
| | | | 382/108 |
| 8,736,832 B2 | 5/2014 | Funada | |
| 9,683,944 B2 | 6/2017 | Moroli | |
| 9,702,695 B2* | 7/2017 | Kawada | H01J 37/222 |
| 9,702,919 B2 | 7/2017 | Amatsuchi | |
| 10,295,477 B2 | 5/2019 | Terasawa et al. | |
| 10,705,027 B2 | 7/2020 | Ono et al. | |
| 2001/0030744 A1* | 10/2001 | Chang | G01N 21/8806 |
| | | | 250/559.36 |
| 2007/0211242 A1 | 9/2007 | Okabe et al. | |
| 2008/0063426 A1* | 3/2008 | Chang | G01N 21/952 |
| | | | 399/98 |
| 2011/0182496 A1* | 7/2011 | Sakai | G01R 31/311 |
| | | | 382/145 |
| 2012/0176612 A1 | 7/2012 | Funada | |
| 2014/0146325 A1* | 5/2014 | Tabuchi | G01B 11/24 |
| | | | 356/609 |
| 2014/0283591 A1* | 9/2014 | Takahashi | G01B 11/25 |
| | | | 73/146 |
| 2016/0103079 A1 | 4/2016 | Moroli | |
| 2017/0098398 A1 | 4/2017 | Amatsuchi | |
| 2017/0122878 A1 | 5/2017 | Ono et al. | |
| 2017/0191946 A1* | 7/2017 | Smith | G07D 7/12 |
| 2017/0276476 A1* | 9/2017 | Konno | G06T 7/0004 |
| 2018/0209916 A1 | 7/2018 | Terasawa et al. | |
| 2019/0011375 A1 | 1/2019 | Ono et al. | |

FOREIGN PATENT DOCUMENTS

| | | |
|---|---|---|
| CN | 105358966 A | 2/2016 |
| CN | 105849534 A | 8/2016 |
| CN | 106133818 A | 11/2016 |
| CN | 107709977 A | 2/2018 |
| CN | 108362702 A | 8/2018 |
| EP | 3088874 A1 | 11/2016 |
| EP | 3315951 A1 | 5/2018 |
| JP | H04-332855 A | 11/1992 |
| JP | H06-201608 A | 7/1994 |
| JP | H08-86633 A | 4/1996 |
| JP | 2001-304835 A | 10/2001 |
| JP | 2005-030848 A | 2/2005 |
| JP | 2010-133967 A | 6/2010 |
| JP | 2010-223621 A | 10/2010 |
| JP | 2012-211773 A | 11/2012 |
| JP | 2015-125089 A | 7/2015 |
| JP | 2015-210150 A | 11/2015 |
| KR | 10-2017-0076957 A | 7/2017 |
| TW | 201841220 A | 11/2018 |

OTHER PUBLICATIONS

Nov. 29, 2023 Office Action issued in Chinese Patent Application No. 201980077268.6.
Dec. 22, 2021 Extended European Search Report issued in Patent Application No. 19890439.3.
Feb. 4, 2020 International Search Report issued in International Patent Application No. PCT/JP2019/043930.
Apr. 30, 2024 Office Action issued in Chinese Patent Application No. 201980077268.6.
Aug. 31, 2024 Office Action issued in Chinese Patent Application No. 201980077268.6.
Zhang et al., "Development of Key Technology on Surface Defects Detection System for Steel Strip", Acta Metrologica Sinica, vol. 28, No. 3, pp. 216-219, Jul. 31, 2007.

* cited by examiner

50mm (a)

(b)

FIG.21
(a) 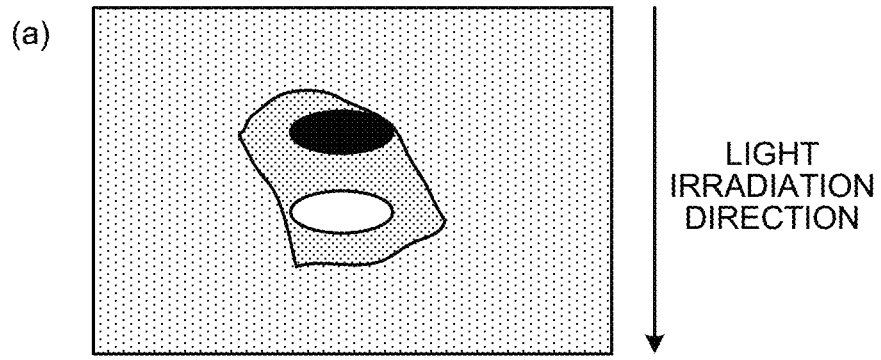
LIGHT IRRADIATION DIRECTION
LIGHT IRRADIATION DIRECTION
(b) 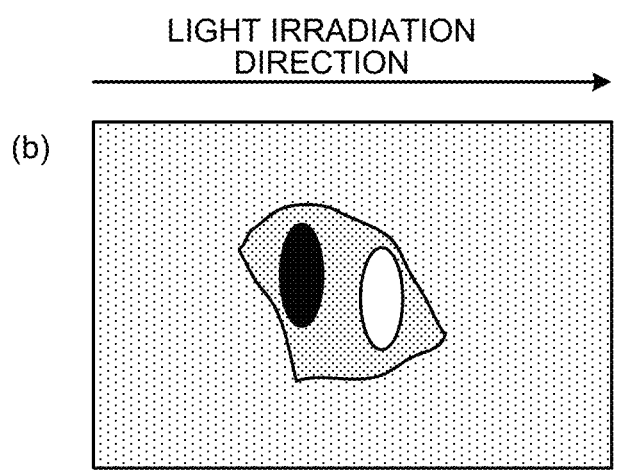
SUBTRACTION IMAGE
(c) 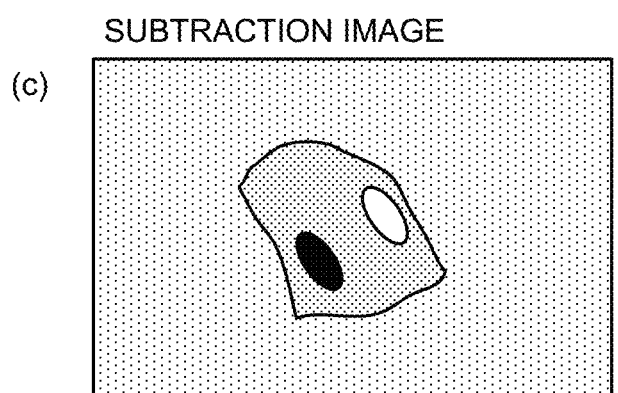
CONTRAST GENERATION FROM LOWER-LEFT CORNER TO UPPER-RIGHT CORNER

SURFACE-DEFECT DETECTING METHOD, SURFACE-DEFECT DETECTING APPARATUS, STEEL-MATERIAL MANUFACTURING METHOD, STEEL-MATERIAL QUALITY MANAGEMENT METHOD, STEEL-MATERIAL MANUFACTURING FACILITY, SURFACE-DEFECT DETERMINATION MODEL GENERATING METHOD, AND SURFACE-DEFECT DETERMINATION MODEL

FIELD

The present invention relates to a surface-defect detecting method of optically detecting a surface defect of a steel material, a surface-defect detecting apparatus, a steel-material manufacturing method, a steel-material quality management method, a steel-material manufacturing facility, a surface-defect determination model generating method, and a surface-defect determination model.

BACKGROUND

Recently, in the manufacturing process of an iron steel product, a surface defect of a steel material in hot rolling or cold rolling has been required to be detected for yield improvement through prevention of a large amount of non-conformance. A steel material in the present description means an iron steel product such as a steel pipe (a seamless steel pipe, a welding steel pipe, or the like), a steel plate (a hot-rolled steel plate, a cold-rolled steel plate, a thick plate, or the like), or a shaped steel, or a half-finished product (a slab or the like) generated in a process through which the iron steel product is manufactured. When a surface defect of a steel material is to be detected through optical surface examination, it is sometimes difficult to distinguish a harmful concave-convex surface defect and a harmless flat scale pattern (attributable to, for example, cooling unevenness) through simple image capturing of the steel material.

In a disclosed method of accurately distinguishing a concave-convex surface defect and a flat scale pattern, distinguishable light beams are emitted from different directions, images are acquired by receiving reflected light of each light beam, and a subtraction image of the acquired images is obtained to detect a surface defect (refer to Patent Literature 1). In another disclosed method, a bright-dark pattern generated by the shape of a surface defect is recognized based on an obtained subtraction image, and whether the surface defect is concave or convex is determined to further improve the accuracy of surface-defect detection (refer to Patent Literature 2).

CITATION LIST

Patent Literature

Patent Literature 1: Japanese Patent Application Laid-open No. 2015-125089
Patent Literature 2: Japanese Patent Application Laid-open No. 2015-210150

SUMMARY

Technical Problem

With the methods disclosed in Patent Literatures 1 and 2, a concave-convex surface defect and a flat scale pattern can be accurately distinguished based on a subtraction image. However, studies by the inventors of the present invention found that, in the methods disclosed in Patent Literatures 1 and 2, a signal of a base steel portion, which has almost no concave and convex portions and has a high surface reflectance, after subtraction is similar to a signal of a concave surface defect and thus difficult to distinguish in some cases. Note that a base steel portion is generated due to flaking of a mill scale, which is caused by rubbing, collision, and the like mainly at a temperature lower than a temperature at which the mill scale is generated on the surface, and for example, a cold-rolling scratch is a base steel portion. A concave-convex surface defect is normally generated as a steel material is transferred with pressing of a protrusion or the like baked on a roll while the steel material is soft in hot rolling. Thus, the concave-convex surface defect has a well-defined concave-convex shape, and is oxidized like a sound portion through a cooling process and obtains a reflectance equivalent to that of the sound portion. As a result, as illustrated in FIG. 22 (a), a clear bright-dark pattern is generated by light irradiation from one side. However, a base steel portion is typically generated as a steel material is rubbed with a structure such as a roll in cold rolling, and when a mill scale is flaked and base steel is exposed, the base steel portion obtains a reflectance higher than that of a sound portion covered by the mill scale. As a result, as illustrated in FIG. 22 (b), the base steel portion has substantially no depth but has a high reflectance, and thus is captured as a high-luminance signal irrespective of the irradiation direction.

When the base steel portion slightly has concave and convex portions, a bright-dark pattern similar to a concave-convex surface defect is sometimes generated in a subtraction image acquired by applying the methods disclosed in Patent Literatures 1 and 2. The base steel portion is a surface defect that can be harmful or harmless depending on the purpose of an examination, and causes no detection and excessive detection of a surface defect. In particular, the concave-convex surface defect and the base steel portion are often treated as harmful and harmless, respectively, in an examination, such as thickness safeguard, for which depth is important, and it is desirable to accurately distinguish the concave-convex surface defect and the base steel portion.

The present invention is intended to solve the above-described problem and provide a surface-defect detecting method, a surface-defect detecting apparatus, a surface-defect determination model generating method, and a surface-defect determination model that are capable of accurately distinguishing a base steel portion and a surface defect. The present invention is also intended to provide a steel-material manufacturing method, a steel-material quality management method, and a steel-material manufacturing facility that are capable of improving a manufacturing yield of a steel material by accurately distinguishing a base steel portion and a surface defect.

Solution to Problem

To solve the problem and achieve the object, a surface-defect detecting method of optically detecting a surface defect of a steel material, according to the present invention includes: an irradiation step of irradiating an examination target part with illumination light beams from different directions by using two or more distinguishable light sources; and a detection step of detecting a surface defect in the examination target part based on the degree of overlapping of bright portions extracted from two or more images formed by reflected light beams of the illumination light beams.

Moreover, in the surface-defect detecting method according to the present invention, the degree of overlapping of the bright portions is a ratio at which an overlapping portion of the bright portions occupies a surface-defect candidate portion in the examination target part.

Moreover, in the surface-defect detecting method according to the present invention, the detection step includes a step of calculating a surface-defect candidate portion in the examination target part based on the bright portions extracted from two or more images formed by reflected light beams of the illumination light beams, and a step of detecting a surface defect in the examination target part based on a ratio at which an overlapping portion of the bright portions occupies the surface-defect candidate portion.

Moreover, in the surface-defect detecting method according to the present invention, the detection step includes a step of detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

Moreover, a surface-defect detecting apparatus configured to optically detect a surface defect of a steel material, according to the present invention includes: an irradiation unit configured to irradiate an examination target part with illumination light beams from different directions by using two or more distinguishable light sources; and a detection unit configured to detect a surface defect in the examination target part based on the degree of overlapping of bright portions extracted from two or more images formed by reflected light beams of the illumination light beams.

Moreover, a steel-material manufacturing method according to the present invention includes a step of manufacturing a steel material while detecting a surface defect of the steel material by using the surface-defect detecting method according to the present invention.

Moreover, a steel-material quality management method according to the present invention includes a step of managing the quality of a steel material by classifying the steel material based on existence of a surface defect by using the surface-defect detecting method according to the present invention.

Moreover, a steel-material manufacturing facility according to the present invention includes: a manufacturing facility configured to manufacture a steel material; and the surface-defect detecting apparatus according to the present invention that is configured to examine the steel material manufactured by the manufacturing facility.

Moreover, a surface-defect determination model generating method according to the present invention includes: using the degree of overlapping of bright portions extracted from two or more images formed by reflected light beams of illumination light beams with which an examination target portion is irradiated from different directions by using two or more distinguishable light sources and a result of determination of whether or not a surface defect exists in the examination target portion, as teacher data; and generating a learning-completed model by machine learning as a surface-defect determination model, where an input value of the learning-completed model being the degree of overlapping of bright portions extracted from the two or more images and an output value of the learning-completed model being a value of determination of whether or not a surface defect exists in the examination target portion corresponding to the two or more images.

Moreover, a surface-defect determination model according to the present invention is the model generated by the surface-defect determination model generating method according to the present invention.

Advantageous Effects of Invention

With a surface-defect detecting method, a surface-defect detecting apparatus, a surface-defect determination model generating method, and a surface-defect determination model according to the present invention, it is possible to accurately distinguish a base steel portion and a surface defect. With a steel-material manufacturing method, a steel-material quality management method, and a steel-material manufacturing facility according to the present invention, it is possible to improve a manufacturing yield of a steel material by accurately distinguishing a base steel portion and a surface defect.

BRIEF DESCRIPTION OF DRAWINGS

FIG. 21 is a schematic diagram illustrating bright-dark patterns obtained with the disposition positions of the light sources illustrated in FIG. 20.

DESCRIPTION OF EMBODIMENTS

The configuration and operation of a surface-defect detecting apparatus as an embodiment of the present invention will be described below with reference to the accompanying drawings.

[Configuration of Surface-Defect Detecting Apparatus]

Figure 1:
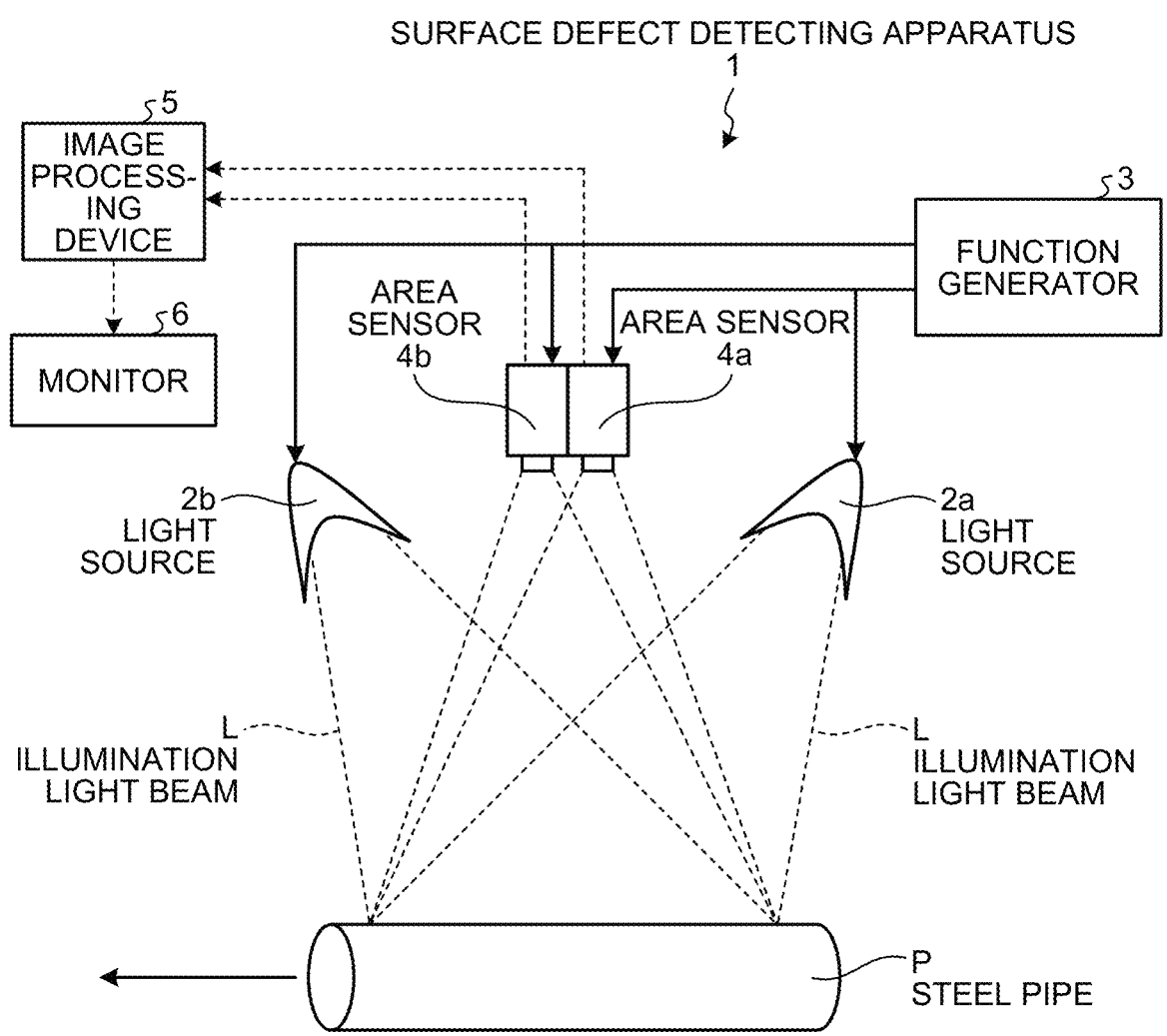
FIG. 1 is a schematic diagram illustrating the configuration of a surface-defect detecting apparatus as an embodiment of the present invention.

FIG. 1 is a schematic diagram illustrating the configuration of a surface-defect detecting apparatus as an embodiment of the present invention. As illustrated in FIG. 1, this surface-defect detecting apparatus 1 as an embodiment of the present invention is a device configured to detect a surface defect of a cylindrical steel pipe P conveyed in the illustrated arrow direction and includes, as main components, light sources 2a and 2b, a function generator 3, area sensors 4a and 4b, an image processing device 5, and a monitor 6.

The light sources 2a and 2b are irradiation units. The light sources 2a and 2b emit distinguishable illumination light beams L to a same examination target part on the surface of the steel pipe P in accordance with a trigger signal from the function generator 3. The light sources 2a and 2b are disposed symmetrically with respect to the examination target part. Specifically, the light sources 2a and 2b are each shifted by a same incident angle from the normal vector of the surface of the steel pipe P and disposed so that an irradiation direction vector of the illumination light beams L and the normal vector of the surface of the steel pipe P are on a same plane.

The purpose of the same incident angle of the illumination light beams L is to have same optical conditions as possible when light sources from different incident directions are distinguished. The incident angles are empirically regarded as same when the difference between the incident angles is equal to or smaller than 20°. In addition, it is empirically desirable that the incident angle of each light source is 25° to 82.5°. It is desirable to select the incident angle in the range of 25° to 55° when the light quantity is desired to be increased, or in the range of 60° to 82.5° when the light quantity is sufficient and the S/N ratio is desired to be increased.

Note that each incident angle in the present specification means the angle between the incident direction of a light beam from the light source 2a or 2b and the normal of the surface of the examination target part. The normal of the surface of the examination target part is set at 0°. Although the number of light sources is two in the present embodiment, the number of light sources may be three or more as long as they are distinguishable. Such distinguishable light sources mean light sources for each of which the amount of reflected light beams obtained from the examination target part can be separately calculated.

The area sensors 4a and 4b are image capturing units. The area sensors 4a and 4b capture two-dimensional images formed by reflected light beams of the illumination light beams L emitted from the light sources 2a and 2b in accordance with the trigger signal from the function generator 3. The area sensors 4a and 4b input data of the captured two-dimensional images to the image processing device 5. The area sensors 4a and 4b are installed on the normal vector of the examination target part as closely as possible while image capturing visual fields thereof are maintained. Note that although area sensors are used in the present embodiment, line sensors may be used. In this case, captured images are one-dimensional images, but a surface-defect detecting method to be described later is applicable.

The image processing device 5 is a detection unit. The image processing device 5 is a device configured to perform processing of determining a harmless base steel portion in the examination target part by using two two-dimensional images input from the area sensors 4a and 4b. This base-steel-portion determination processing is the most important technology of the present invention, and thus will be described later in detail. The image processing device 5 may perform defect determination by machine learning. In addition, the image processing device 5 may detect a surface defect in the examination target part as necessary by performing subtraction processing to be described later. The image processing device 5 outputs, to the monitor 6, two-dimensional images input from the area sensors 4a and 4b and information related to a result of surface-defect detection.

The surface-defect detecting apparatus 1 having such a configuration performs the processing of determining a base steel portion in the examination target part by executing the surface-defect detecting method described below. In addition, the surface-defect detecting apparatus 1 distinguishes scale or harmless pattern, a concave-convex surface defect, and a base steel portion in the examination target part as necessary. Note that scale or harmless pattern means portions including a surface film or a surface texture having a thickness of several μm to several tens of μm approximately and optical properties different from those of the base steel portion, and portions that cause noise in the surface-defect detecting method.

[Surface-Defect Detecting Method]

Figure 2:
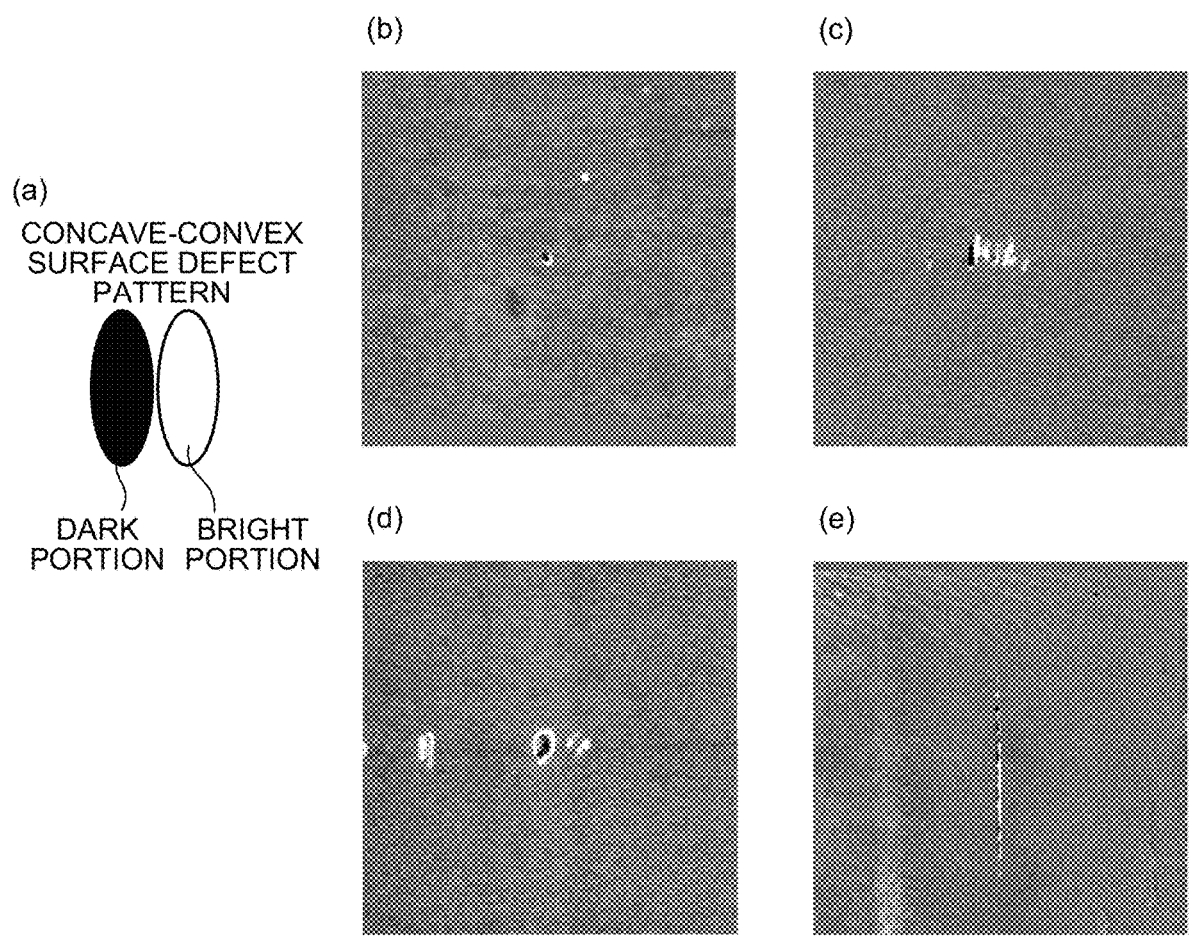
FIG. 2 is a diagram illustrating exemplary subtraction images of a base steel portion.

In surface-defect detecting methods disclosed in Patent Literatures 1 and 2, the same subtraction processing on a two-dimensional image of a base steel portion of a cold-rolling scratch or the like generates bright-dark patterns as illustrated in FIGS. 2 (b) to (e) like the bright-dark pattern of a concave-convex surface defect as illustrated in FIG. 2 (a) in some cases. This is because the base steel portion has a high reflectance and luminance variance and thus bright and dark portions are randomly generated. In the field of a steel material, such as a thick plate or a steel pipe, for which the depth of a surface defect is important, in particular, the base steel portion extremely frequently occurs as compared to a surface defect, and thus is difficult to distinguish based on the characteristic amount or the like.

However, the base steel portion needs to be determined to be harmful or harmless, depending on examination needs.

Thus, when the base steel portion having a bright-dark pattern similar to the bright-dark pattern of the surface defect cannot be distinguished, excessive detection occurs and the performance of surface-defect detection decreases. In addition, the base steel portion needs to be distinguished as a surface defect in some cases when the base steel portion needs to be determined to be harmful. Furthermore, the base steel portion has various shapes and needs to be determined to be harmless in many cases.

To stably detect such a base steel portion, its characteristic that the base steel portion is brighter than a stationary portion when irradiated with illumination light beam from any direction can be used. The stationary portion in the present description is a mill scale portion, which is not the surface defect nor the base steel portion. Specifically, the base steel portion can be detected by detecting an overlapping portion of bright portions in the region of a surface-defect candidate portion extracted through threshold value processing, labeling, or the like from two two-dimensional images input from the area sensors 4a and 4b.

Figure 3:
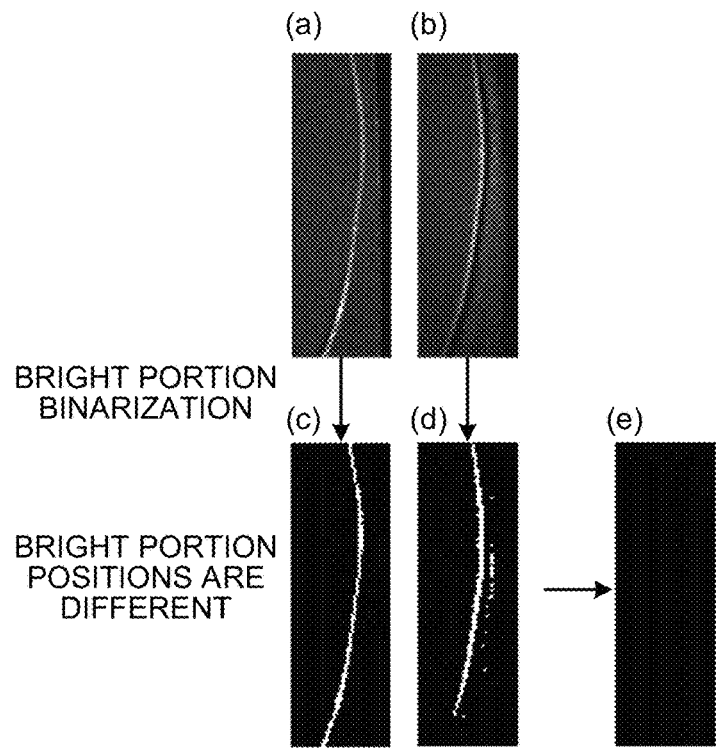
FIG. 3 is a diagram illustrating a result of AND processing performed on a bright-portion image of a concave surface defect.
Figure 4:
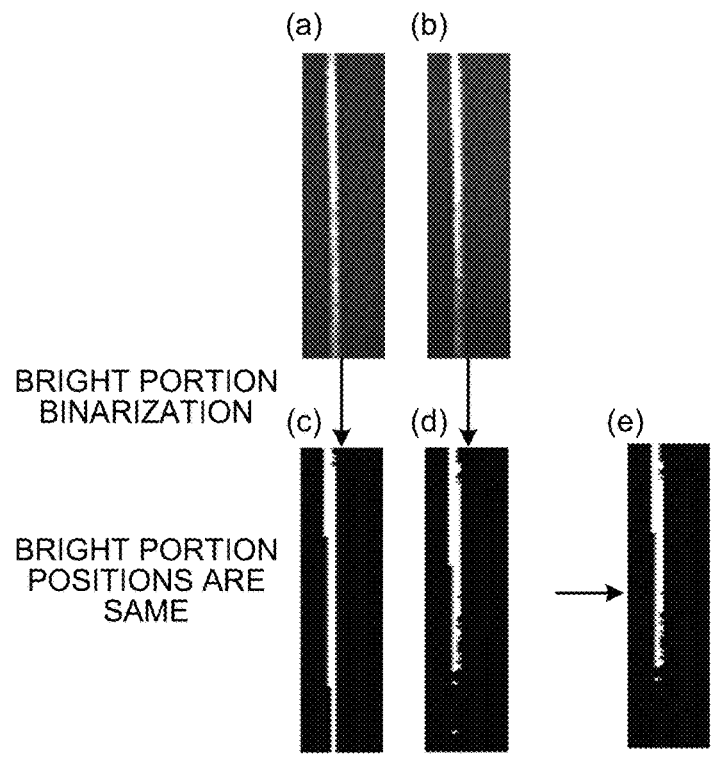
FIG. 4 is a diagram illustrating a result of AND processing performed on a bright-portion image of a base steel portion.

FIGS. 3 and 4 illustrate exemplary results of detecting, through binarization processing, bright portions of two two-dimensional images input from the area sensors 4a and 4b and performing AND processing on images of the detected bright portions for a concave surface defect and a base steel portion, respectively, at a surface-defect candidate portion. As illustrated in FIGS. 3 (c) to (e), the positions of the bright portions of the two two-dimensional images (FIGS. 3 (c) and (d)) are different from each other for the concave surface defect, and thus no signals are not detected through the AND processing (FIG. 3 (e)). However, as illustrated in FIGS. 4 (c) to (e), the positions of the bright portions of the two two-dimensional images (FIGS. 4 (c) and (d)) coincide with each other for the base steel portion, and thus signals are detected at almost all places of bright portions and dark portions through the AND processing (FIG. 4 (e)).

Note that a well-known method may be used as the method of detecting a surface-defect candidate portion at an examination target part. In particular, a method using a subtraction image, which is disclosed in Patent Literatures 1 and 2 has such an advantage that the method can eliminate a scale pattern and a harmless pattern through subtraction processing and use a unique bright-dark pattern generated by a concave-convex surface defect, and thus can accurately detect a surface-defect candidate portion, in particular, a concave-convex surface-defect candidate portion, and accordingly, the method is preferable.

Note that the timing of detection of a surface-defect candidate portion may be any timing as long as the detection step to be described later is performed before the step (S5, S15, S25, S37, or S48 to be described later) of calculating a combined-bright-portion occupancy. For example, a surface-defect candidate portion may be detected in advance, separately from the detection step to be described later (refer to first and second embodiments). Alternatively, for example, in the detection step to be described later, a surface-defect candidate portion may be detected based on copies of a bright-portion binarized image "a" and a bright-portion binarized image "b" used in the detection step (refer to a third embodiment). Alternatively, for example, in parallel to the detection step to be described later, a concave-convex surface defect may be detected by using subtraction images obtained from copies of a raw image "a", a raw image "b", a correction image "a", a correction image "b", and the like used in the detection step, and the detected concave-convex surface defect may be set as a surface-defect candidate portion.

Thus, whether a surface-defect candidate portion is a surface defect or a base steel portion can be determined by extracting a combined bright-portion image through AND processing on bright-portion images of two two-dimensional images and evaluating the surface-defect candidate portion based on the combined bright-portion image. A base steel portion can be detected by extracting bright portions of the two two-dimensional images through threshold value processing and performing AND processing on the bright portions. In a case of a surface defect or the like as well as a base steel portion, bright portions of two two-dimensional images obtained through irradiation from different directions slightly overlap by accident in some cases. However, in a case of a base steel portion, the reflectance is high in two two-dimensional images obtained through irradiation from different directions, and bright portions overlap almost in the entire region. Thus, the degree of overlapping of the bright portions may be calculated as a characteristic amount, and a base steel portion and a surface defect may be distinguished by using this index. This method can more accurately perform distinguishment than in a case in which determination is performed on the existence of an overlapping portion, and thus is preferable.

The following describes surface-defect detecting methods as the first to fifth embodiments of the present invention, which are thought of based on the above-described idea.

First Embodiment

First, a surface-defect detecting method as the first embodiment of the present invention will be described below with reference to FIG. 5.

The surface-defect detecting method as the first embodiment of the present invention includes an irradiation step, an image capturing step, and a detection step. In the irradiation step, the light sources 2a and 2b emit distinguishable illumination light beams L to a same examination target part on the surface of the steel pipe P in accordance with a trigger signal from the function generator 3. In the image capturing step, the area sensors 4a and 4b capture, in accordance with a trigger signal from the function generator 3, two-dimensional images formed by reflected light beams of the illumination light beams L emitted from the light sources 2a and 2b. In the detection step, the image processing device 5 determines a harmless base steel portion by using the two two-dimensional images input from the area sensors 4a and 4b.

Figure 5:
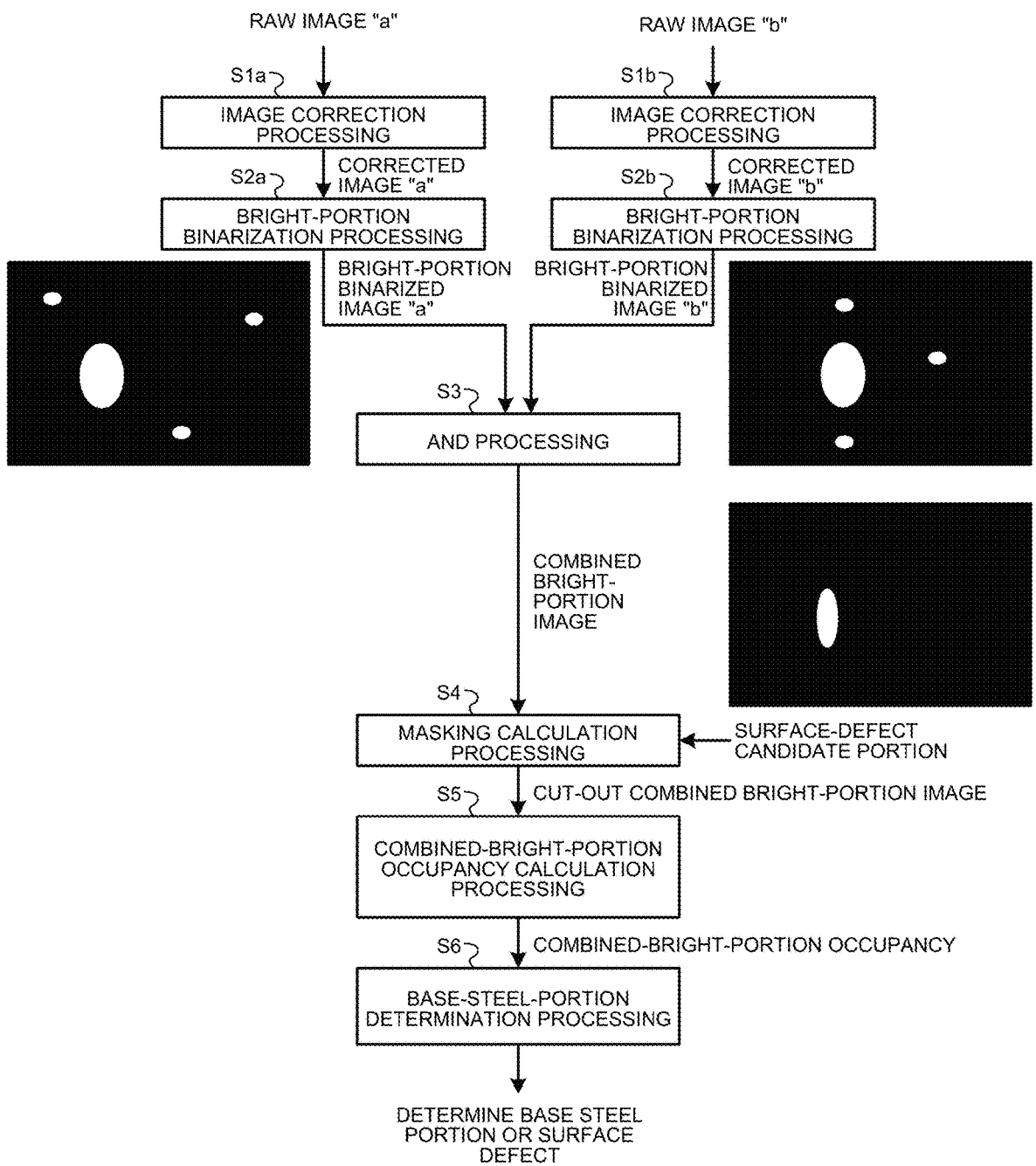
FIG. 5 is a flowchart illustrating the process of a detection step in a surface-defect detecting method as a first embodiment of the present invention.

FIG. 5 is a flowchart illustrating the process of the detection step in the surface-defect detecting method as the first embodiment of the present invention. As illustrated in FIG. 5, first in the detection step of the present embodiment, the image processing device 5 performs image correction processing on two two-dimensional images (raw images "a" and "b") input from the area sensors 4a and 4b, thereby generating correction images "a" and "b" (steps S1a and S1b). The image correction processing in the present description includes processing of cutting out an examination target region, and processing such as shading correction of correcting entire luminance unevenness attributable to an optical system.

Subsequently, the image processing device 5 performs, on each of the correction images "a" and "b", bright portion binarization processing of detecting a bright portion by setting one to the value of a pixel having a luminance equal to or higher than a threshold value and setting zero to the value of a pixel having a luminance lower than the threshold value. Through this processing, the image processing device 5 generates a bright-portion binarized image "a" and a bright-portion binarized image "b" (steps S2a and S2b). In FIG. 5, an exemplary bright-portion binarized image "a" is illustrated to the left of the label "bright-portion binarized image "a"", and an exemplary bright-portion binarized image "b" is illustrated to the right of the label "bright-portion binarized image "b"". Subsequently, the image processing device 5 performs AND processing on the bright-portion binarized images "a" and "b". Through this processing, the image processing device 5 extracts a pixel having the value of one in both bright-portion binarized images "a" and "b", thereby generating a combined bright-portion image (step S3). In FIG. 5, an exemplary combined bright-portion image is illustrated to the right of the label "combined bright-portion image".

Subsequently, the image processing device 5 performs masking calculation processing on the combined bright-portion image by using a surface-defect candidate portion. Through this processing, the image processing device 5 generates a cut-out combined bright-portion image obtained by cutting out a target region of determination as a base steel portion (in other words, a region that is a surface-defect candidate portion and a bright portion) (step S4). Subsequently, the image processing device 5 calculates, as a combined-bright-portion occupancy, the ratio at which the cut-out combined bright-portion image occupies the entire surface-defect candidate portion (step S5). In addition, the image processing device 5 determines whether the surface-defect candidate portion is a base steel portion or a surface defect through threshold value processing or the like using the calculated combined-bright-portion occupancy. When having determined that the surface-defect candidate portion is not a base steel portion, the image processing device 5 determines that the surface-defect candidate portion is a surface defect (step S6). Note that the present embodiment is an example in which the degree of overlapping of the combined bright-portion image over the surface-defect candidate portion is calculated, but another processing method is applicable as long as the degree of overlapping of the combined bright-portion image over the entire surface-defect candidate portion can be calculated. For example, a surface-defect candidate portion may be measured by another method such as eddy current flaw detection or ultrasonic wave flaw detection, and the ratio at which the combined bright-portion image occupies the surface-defect candidate portion may be calculated.

Second Embodiment

Subsequently, a surface-defect detecting method as the second embodiment of the present invention will be described below with reference to FIG. 6.

The surface-defect detecting method as the second embodiment of the present invention includes an irradiation step, an image capturing step, and a detection step. In the irradiation step, the light sources 2a and 2b emit distinguishable illumination light beams L to a same examination target part on the surface of the steel pipe P in accordance with a trigger signal from the function generator 3. In the image capturing step, the area sensors 4a and 4b capture, in accordance with a trigger signal from the function generator 3, two-dimensional images formed by reflected light beams of the illumination light beams L emitted from the light sources 2a and 2b. In the detection step, the image processing device 5 determines a harmless base steel portion by using the two two-dimensional images input from the area sensors 4a and 4b.

Figure 6:
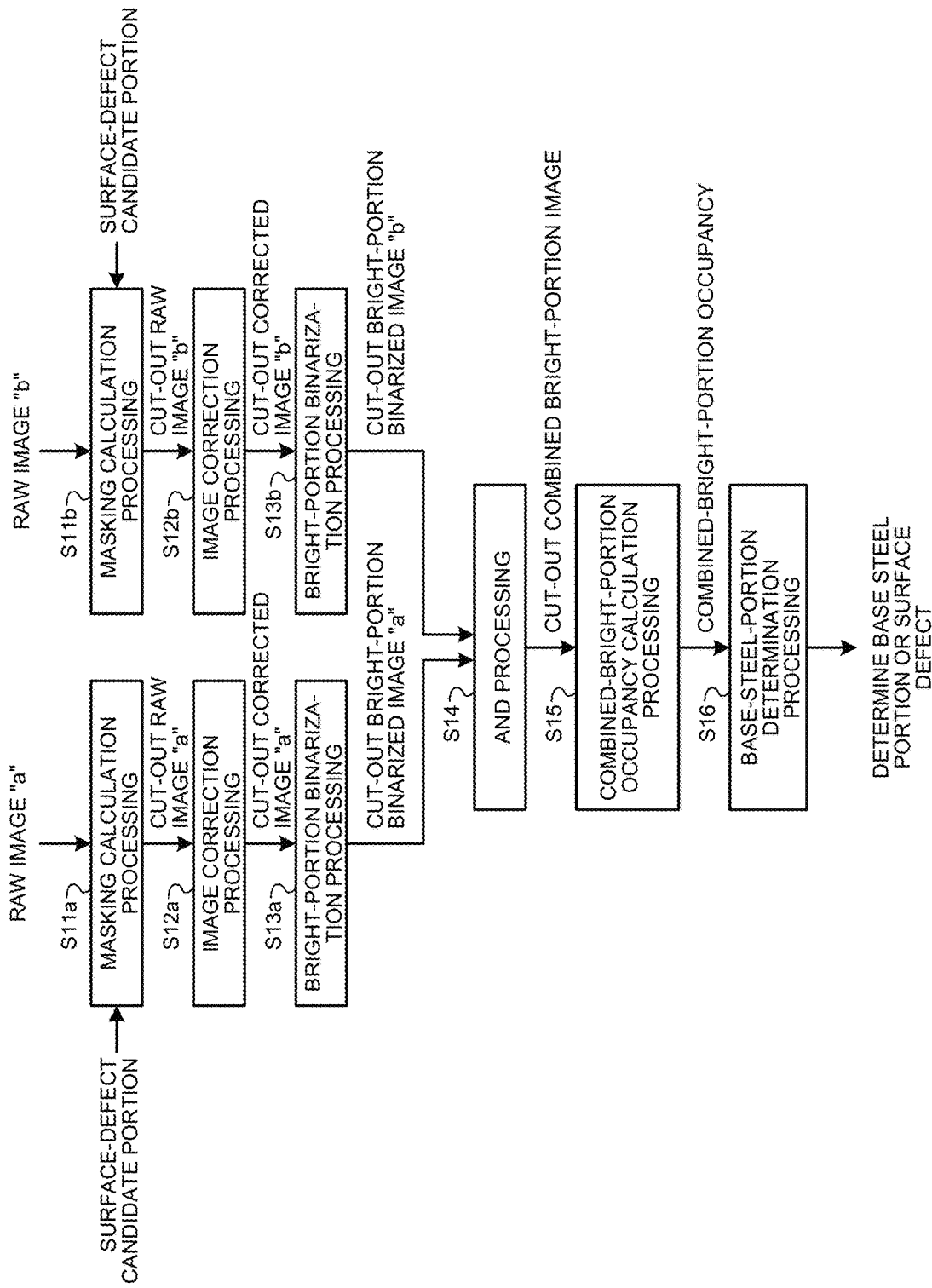
FIG. 6 is a flowchart illustrating the process of a detection step in a surface-defect detecting method as a second embodiment of the present invention.

FIG. 6 is a flowchart illustrating the process of the detection step in the surface-defect detecting method as the second embodiment of the present invention. As illustrated in FIG. 6, first in the detection step of the present embodiment, the image processing device 5 performs masking calculation processing using a surface-defect candidate portion on each of two two-dimensional images (raw images "a" and "b") input from the area sensors 4a and 4b, thereby generating a cut-out raw image "a" and a cut-out raw image "b" by cutting out a target region of determination as a base steel portion (steps S11a and S11b). Subsequently, the image processing device 5 performs image correction processing on the cut-out raw images "a" and "b", thereby generating a cut-out correction image "a" and a cut-out correction image "b" (steps S12a and S12b). The image correction processing in the present description includes processing such as shading correction of correcting entire luminance unevenness attributable to an optical system.

Subsequently, the image processing device 5 performs, on each of the cut-out correction images "a" and "b", bright portion binarization processing of detecting a bright portion by setting one to the value of a pixel having a luminance equal to or higher than a threshold value and setting zero to the value of a pixel having a luminance lower than the threshold value. Through this processing, the image processing device 5 generates a cut-out bright-portion binarized image "a" and a cut-out bright-portion binarized image "b" (steps S13a and S13b). Subsequently, the image processing device 5 performs AND processing on the cut-out bright-portion binarized images "a" and "b". Through this processing, the image processing device 5 extracts a pixel having the value of one in both cut-out bright-portion binarized images "a" and "b", thereby generating a cut-out combined bright-portion image (step S14). Subsequently, the image processing device 5 calculates, as a combined-bright-portion occupancy, the ratio at which the cut-out combined bright-portion image occupies the entire surface-defect candidate portion (step S15). In addition, the image processing device 5 determines whether the surface-defect candidate portion is a base steel portion or a surface defect through threshold value processing or the like using the calculated combined-bright-portion occupancy. When having determined that the surface-defect candidate portion is not a base steel portion, the image processing device 5 determines that the surface-defect candidate portion is a surface defect (step S16).

Third Embodiment

Subsequently, a surface-defect detecting method as the third embodiment of the present invention will be described below with reference to FIG. 7.

The surface-defect detecting method as the third embodiment of the present invention includes an irradiation step, an image capturing step, and a detection step. In the irradiation step, the light sources 2a and 2b emit distinguishable illumination light beams L to a same examination target part on the surface of the steel pipe P in accordance with a trigger signal from the function generator 3. In the image capturing step, the area sensors 4a and 4b capture, in accordance with a trigger signal from the function generator 3, two-dimensional images formed by reflected light beams of the illumination light beams L emitted from the light sources 2a and 2b. In the detection step, the image processing device 5 determines a harmless base steel portion by using the two two-dimensional images input from the area sensors 4a and 4b.

Figure 7:
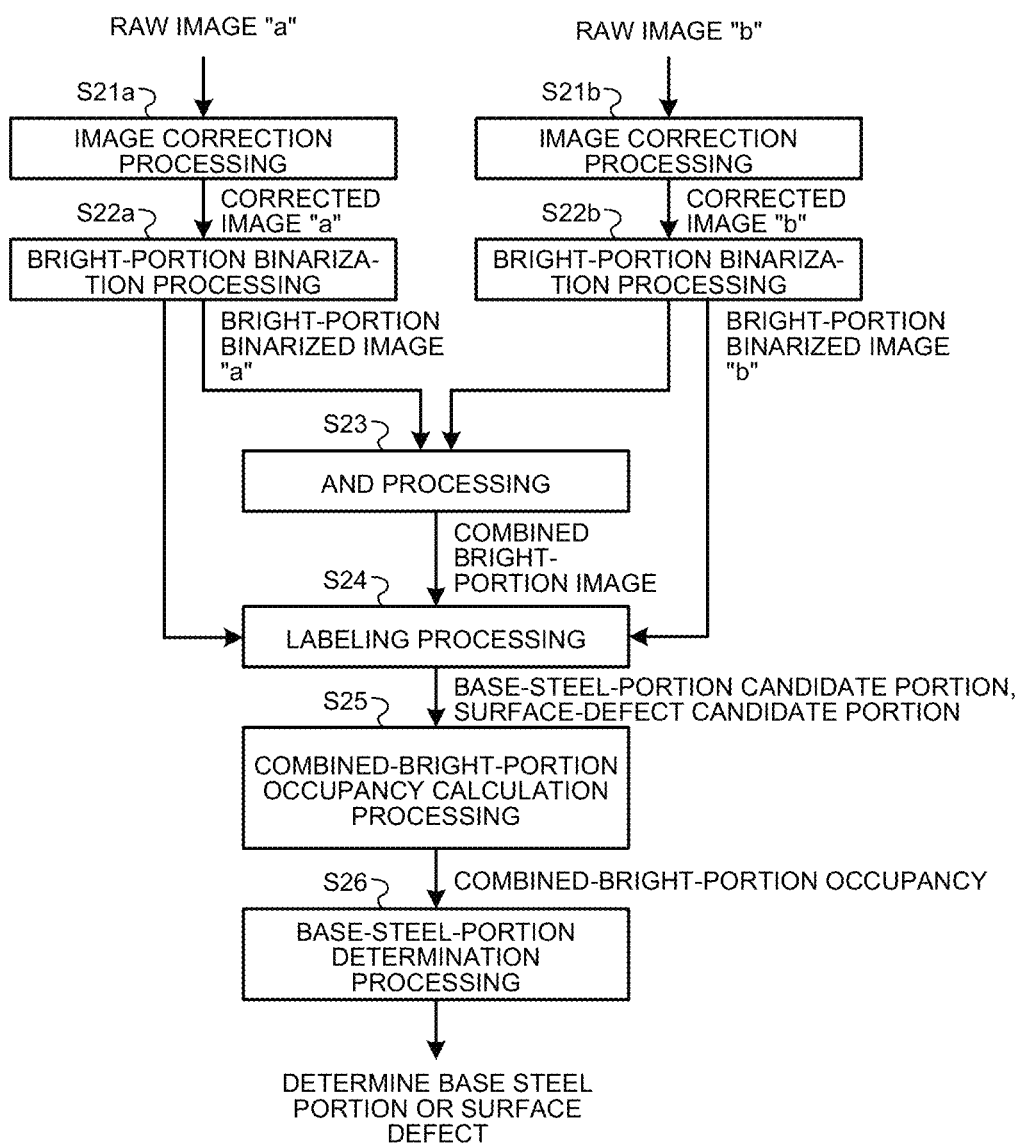
FIG. 7 is a flowchart illustrating the process of a detection step in a surface-defect detecting method as a third embodiment of the present invention.

FIG. 7 is a flowchart illustrating the process of the detection step in the surface-defect detecting method as the third embodiment of the present invention. As illustrated in FIG. 7, first in the detection step of the present embodiment, the image processing device 5 performs image correction processing, such as calibration, shading correction, and noise removal, using camera parameters derived in advance on each of two two-dimensional images (raw images "a" and "b") input from the area sensors 4a and 4b, thereby generating a correction image "a" and a correction image "b" (steps S21a and S21b). Through this image correction processing, the following bright-portion extraction processing and the like can be accurately performed.

Figure 8:
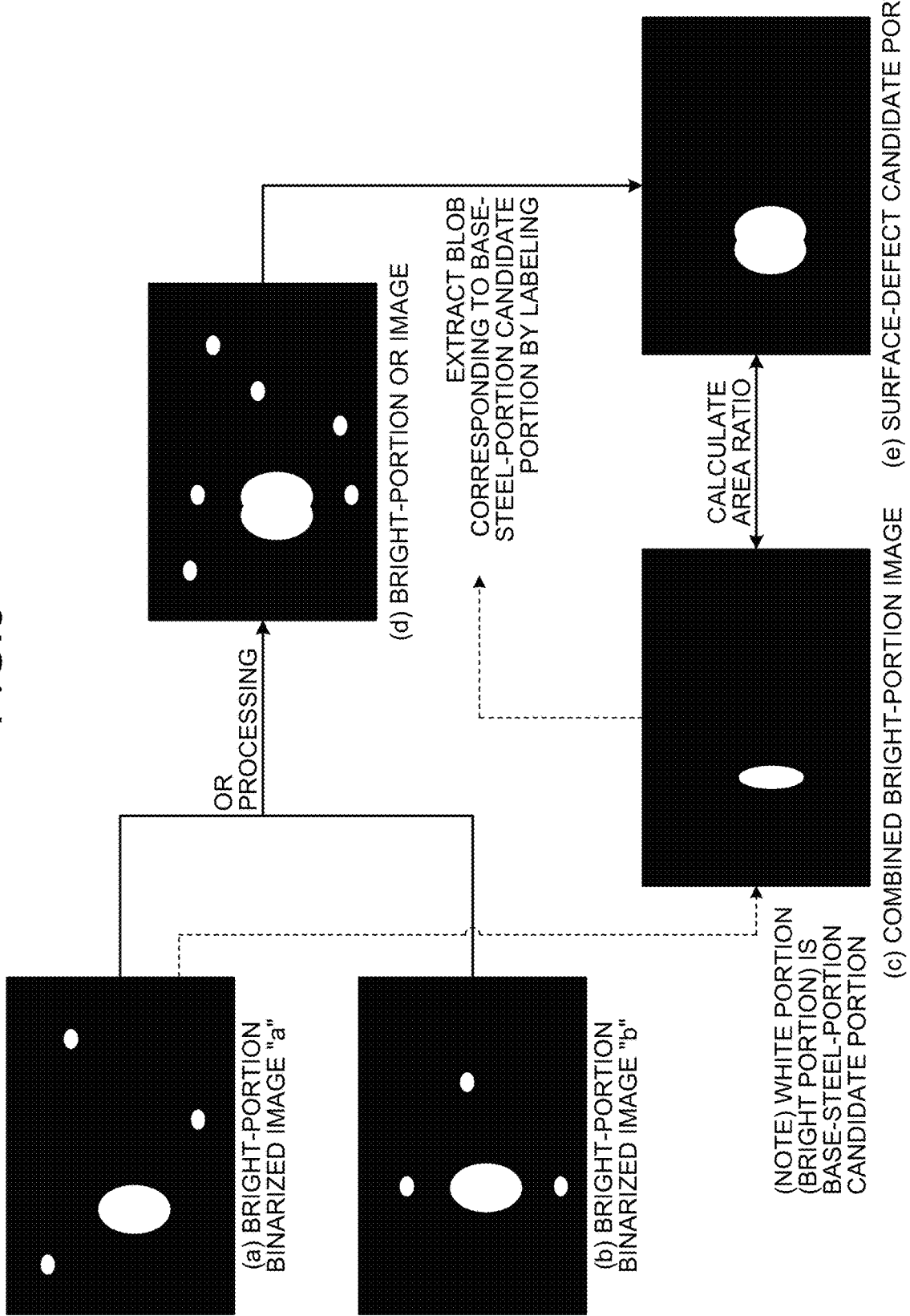
FIG. 8 is a diagram for describing exemplary labeling processing illustrated in FIG. 7.

Subsequently, the image processing device 5 performs, on each of the correction images "a" and "b", bright portion binarization processing of detecting a bright portion by setting one to the value of a pixel having a luminance equal to or higher than a threshold value and setting zero to the value of a pixel having a luminance lower than the threshold value. Through this processing, the image processing device 5 generates a bright-portion binarized image "a" and a bright-portion binarized image "b" (steps S22a and S22b). Subsequently, the image processing device 5 performs AND processing on the bright-portion binarized images "a" and "b". Through this processing, the image processing device 5 extracts a pixel having the value of one in both bright-portion binarized images "a" and "b", thereby generating a combined bright-portion image (step S23). A set of pixels having the value of one in the combined bright-portion image form a bright-portion overlapping portion at which bright portions of the bright-portion binarized images "a" and "b" overlap. Accordingly, a portion at which high-reflectance portions overlap in the bright-portion binarized images "a" and "b" can be extracted. FIG. 8 (*a*) illustrates an exemplary bright-portion binarized image "a", FIG. 8 (*b*) illustrates an exemplary bright-portion binarized image "b", and FIG. 8 (*c*) illustrates an exemplary combined bright-portion image.

Subsequently, the image processing device 5 labels pixels of a bright portion having the value of one in the generated combined bright-portion image and sets each blob (set of labeled pixels) as a base-steel-portion candidate portion. A white portion (which is a bright portion) in the combined bright-portion image in FIG. 8 (*c*) is the base-steel-portion candidate portion and corresponds to an overlapping portion of bright portions of the bright-portion binarized images "a" and "b". The image processing device 5 performs OR processing on the bright-portion binarized images "a" and "b" generated at steps S22a and S22b this time. Through this processing, the image processing device 5 generates a bright-portion OR image. FIG. 8 (*d*) illustrates an exemplary bright-portion OR image. Then, the image processing device 5 labels the above-described base-steel-portion candidate portion in the bright-portion OR image obtained through this processing. Then, the image processing device 5 extracts, as a blob, each bunch of bright portions including the labeled base-steel-portion candidate portion. Each blob is set as a surface-defect candidate portion (step S24). FIG. 8 (*e*) illustrates an exemplary surface-defect candidate portion. A white portion (which is a bright portion) is the surface-defect candidate portion. In the combined bright-portion image in FIG. 8 (*c*), a bright portion that is unlikely to be a surface defect is deleted through the AND processing at step S23. As clearly understood from FIG. 8 (*d*), all bright portions remain through the OR processing irrespective of whether they are defects. Thus, the surface-defect candidate portion can be reliably detected through labeling with the base-steel-portion candidate portion.

Subsequently, the image processing device 5 calculates, for each surface-defect candidate portion, as a combined-bright-portion occupancy, a value obtained dividing the area of the base-steel-portion candidate portion by the area of the surface-defect candidate portion (step S25). Lastly, the image processing device 5 detects a base steel portion by determining whether the surface-defect candidate portion is a base steel portion based on the calculated combined-bright-portion occupancy. When having determined that the surface-defect candidate portion is not a base steel portion, the image processing device 5 determines that the surface-defect candidate portion is a surface defect (step S26).

Note that a plurality of indexes are available for indicating the degree of overlapping of the base-steel-portion candidate portion over the surface-defect candidate portion. For example, the ratio at which the area of each base-steel-portion candidate portion occupies the area of the surface-defect candidate portion of the two images before subjected to the AND processing can be used. In this case, the area of the surface-defect candidate portion is, for example, the area of a portion obtained through OR processing on two surface-defect candidate portions, or the sum or maximum value of the areas of surface-defect candidate portions. A surface-defect candidate portion is more likely to be a base steel portion as its combined-bright-portion occupancy is higher. Thus, a certain threshold value may be used to determine that the surface-defect candidate portion is a base steel portion when the combined-bright-portion occupancy is equal to or larger than the threshold value.

Alternatively, the combined-bright-portion occupancy may be used as a characteristic amount, and a base steel portion may be detected by using a well-known machine learning method such as a binary decision tree method. Specifically, the combined-bright-portion occupancy and a result of determination of whether a surface defect exists in the examination target part are used as teacher data to generate a learning-completed model by machine learning, an input value of the learning-completed model being the combined-bright-portion occupancy calculated from two or more images, an output value of the learning-completed model being the value of determination of whether a surface defect exists in the examination target part corresponding to the two or more images. The generated learning-completed model may be set as a surface defect determination model, the combined-bright-portion occupancy may be input to the surface-defect determination model, and a base steel portion may be detected by determining whether the surface-defect candidate portion is a base steel portion by using the output value of the surface-defect determination model. Accordingly, it is possible to accurately distinguish a base steel portion and a surface defect, which have been difficult to distinguish by a conventionally method.

Whether the surface-defect candidate portion is a base steel portion may be determined based on the positional relation between the surface-defect candidate portion and the base steel portion calculated in the first to third embodiments. Specifically, the surface-defect candidate portion is likely to be a base steel portion when the surface-defect candidate portion and the base steel portion calculated in the first to third embodiments are at substantially same positions. Similarly to the first to third embodiments, another processing method is applicable when the degree of overlapping of bright portions in the surface-defect candidate portion can be calculated.

Fourth Embodiment

When concave and convex portions slightly exist at a base steel portion, a bright-dark pattern similar to a concave-convex surface defect occurs, and the base steel portion and the concave-convex surface defect cannot be accurately distinguished in some cases. Thus, in the present embodiment, the base steel portion and the concave-convex surface defect are accurately distinguished by using, as a surface-defect candidate portion, a concave-convex surface defect that can be calculated by the methods disclosed in Patent Literatures 1 and 2. Subsequently, a surface-defect detecting method as the fourth embodiment of the present invention will be described below with reference to FIG. 9.

The surface-defect detecting method as the fourth embodiment of the present invention includes an irradiation step, an image capturing step, and a detection step. In the irradiation step, the light sources 2a and 2b emit distinguishable illumination light beams L to a same examination target part on the surface of the steel pipe P in accordance with a trigger signal from the function generator 3. In the image capturing step, the area sensors 4a and 4b capture, in accordance with a trigger signal from the function generator 3, two-dimensional images formed by reflected light beams of the illumination light beams L emitted from the light sources 2a and 2b. In the detection step, the image processing device 5 distinguishes scale and/or harmless pattern, a concave-convex surface defect, and a base steel portion by using two two-dimensional images input from the area sensors 4a and 4b.

Figure 9:
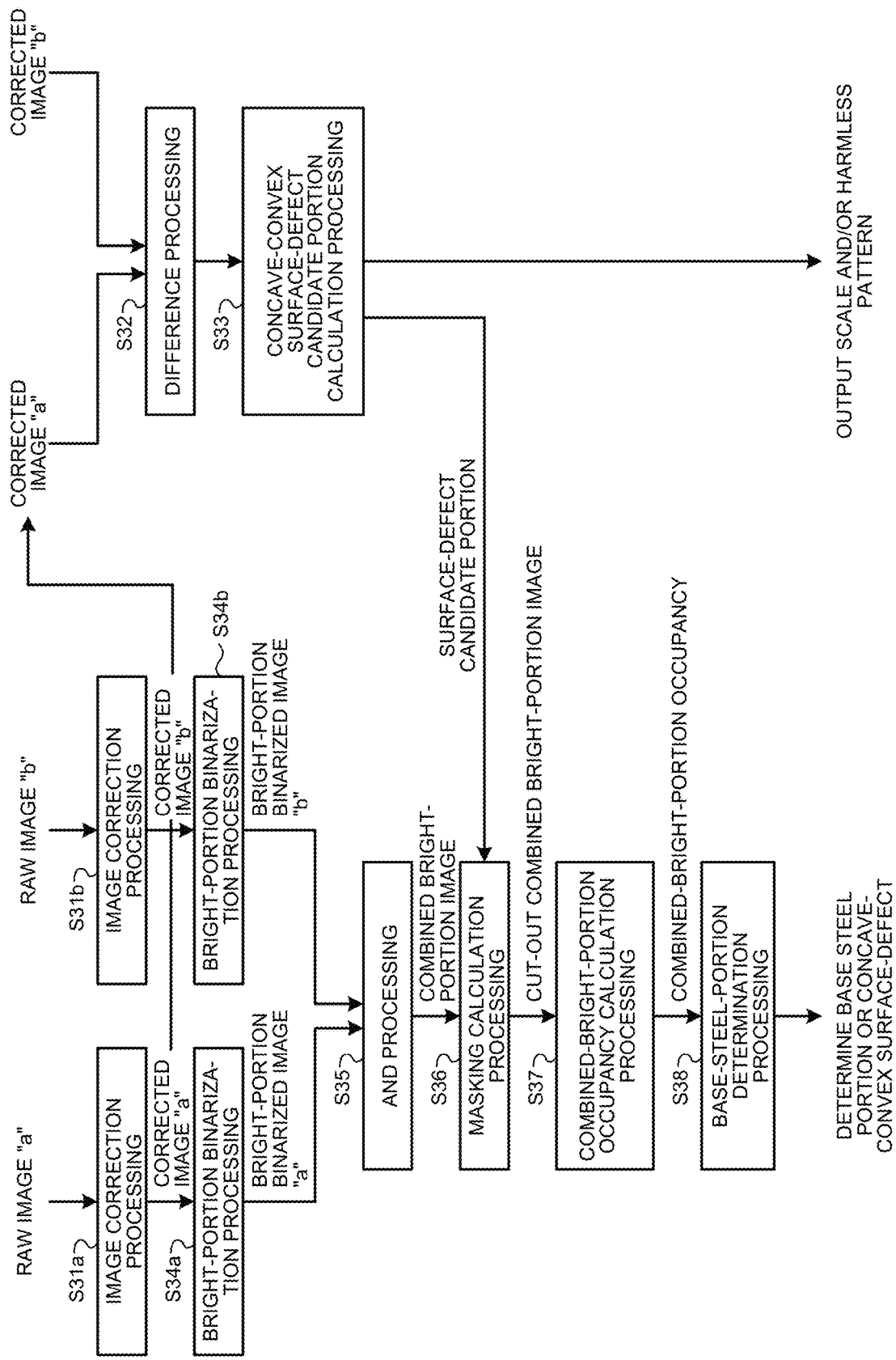
FIG. 9 is a flowchart illustrating the process of a detection step in a surface-defect detecting method as a fourth embodiment of the present invention.

FIG. 9 is a flowchart illustrating the process of the detection step in the surface-defect detecting method as the fourth embodiment of the present invention. As illustrated in FIG. 9, first in the detection step of the present embodiment, the image processing device 5 performs image correction processing, such as calibration, shading correction, and noise removal, using camera parameters derived in advance on each of two two-dimensional images (raw images "a" and "b") input from the area sensors 4a and 4b, thereby generating a correction image "a" and a correction image "b" (steps S31a and S31b). Subsequently, the image processing device 5 performs subtraction processing on the correction images "a" and "b", thereby generating a subtraction image (step S32). Subsequently, the image processing device 5 calculates a concave-convex surface-defect candidate portion in the examination target part based on the generated subtraction image and outputs information related to scale and/or harmless pattern removed through the subtraction processing (step S33).

The image processing device 5 performs, on each of the correction images "a" and "b" generated at steps S31a and S31b, bright portion binarization processing of detecting a bright portion by setting one to the value of a pixel having a luminance equal to or higher than a threshold value and setting zero to the value of a pixel having a luminance lower than the threshold value. Through this processing, the image processing device 5 generates a bright-portion binarized image "a" and a bright-portion binarized image "b" (steps S34a and S34b). Subsequently, the image processing device 5 performs AND processing on the bright-portion binarized images "a" and "b". Through this processing, the image processing device 5 extracts a pixel having the value of one in both bright-portion binarized images "a" and "b", thereby generating a combined bright-portion image (step S35). Subsequently, the image processing device 5 performs masking calculation processing on the combined bright-portion image by using the concave-convex surface-defect candidate portion calculated through the processing at step S33. Through this processing, the image processing device 5 generates a cut-out combined bright-portion image by cutting out a target region of determination as a base steel portion (step S36). Subsequently, the image processing device 5 calculates, as the combined-bright-portion occupancy, the ratio at which the cut-out combined bright-portion image occupies the entire concave-convex surface-defect candidate portion (step S37). In addition, the image processing device 5 determines whether the concave-convex surface-defect candidate portion is a base steel portion or a concave-convex surface defect through threshold value processing or the like using the calculated combined-bright-portion occupancy. When having determined that the concave-convex surface-defect candidate portion is not a base steel portion, the image processing device 5 determines that the concave-convex surface-defect candidate portion is a surface defect (step S38). The base steel portion leads to a bright signal across the concave-convex surface-defect candidate portion for two irradiation directions, but the concave-convex surface defect has shade and shadow that are different between two irradiation directions, and thus bright and dark portions are generated at different positions across the concave-convex surface-defect candidate portion. Accordingly, the combined-bright-portion occupancy of the base steel portion is high, and the combined-bright-portion occupancy of the concave-convex surface defect is low.

Note that a well-known method may be used as the method of detecting a concave-convex surface-defect candidate portion in the examination target part by using the subtraction image obtained through the processing at step S33. In particular, the methods disclosed in Patent Literatures 1 and 2 can eliminate scale and/or harmless pattern through subtraction processing and use a unique bright-dark pattern generated by a concave-convex surface defect, and thus have such an advantage that the methods can accurately detect a concave-convex surface-defect candidate portion, and accordingly, the methods are preferable. The following describes, as an example of the processing at step S33, an example using the technologies disclosed in Patent Literatures 1 and 2.

When Ia(x, y) (the number of pixels is X×Y, the x coordinate satisfies 1≤x≤X, and the y coordinate satisfies 1≤y≤Y) represents the luminance value of each pixel included in a two-dimensional image Ia obtained in a case in which the illumination light beam L is emitted from the light source 2a, and Ib(x, y) represents the luminance value of each pixel included in a two-dimensional image Ib obtained in a case in which the illumination light beam L is emitted from the light source 2b, the luminance value I_diff(x, y) of each pixel of a subtraction image I_diff that can be obtained through the subtraction processing at step S32 is expressed by Expression (1) described below.

$$I\_diff(x,y)=I^*,y)-Ib(x,y) \qquad (1)$$

Figure 10:
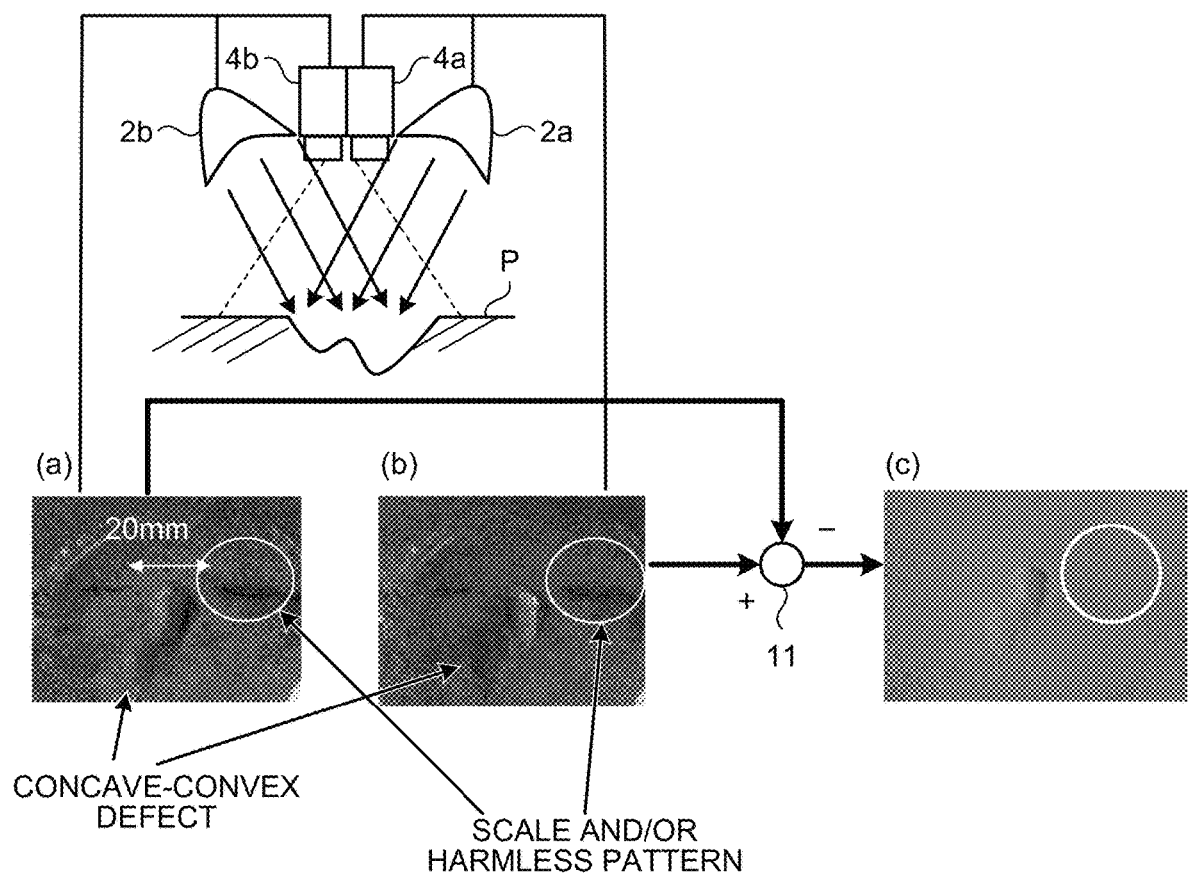
FIG. 10 is a diagram illustrating two exemplary two-dimensional images obtained through image capturing of a concave-convex surface defect and scale and/or harmless pattern, and an exemplary subtraction image thereof.

FIGS. 10 (a), (b), and (c) illustrate exemplary two-dimensional images Ia and Ib obtained by capturing sound scale and/or harmless pattern, which are not concave-convex surface defects nor surface defects, and an exemplary subtraction image I_diff thereof, respectively. As illustrated in FIGS. 10 (a), (b), and (c), the angle between the normal vector of the surface and the light source 2a is equal to the angle between the normal vector of the surface and the light source 2b irrespective of the existence of scale and/or harmless pattern at a sound portion, and thus the luminance value Ia(x, y)=the luminance value Ib(x, y), in other words, the luminance value I_diff(x, y)=0 holds.

However, the surface has a concave-convex shape at a concave-convex surface defect portion, and thus there always exists a place where the angle between the normal vector of the surface and the light source 2a is not equal to the angle between the normal vector of the surface and the light source 2b, and the luminance value Ia(x, y)≠the luminance value Ib(x, y), in other words, the luminance value I_diff(x, y)≠0 holds. Thus, images of sound scale and/or harmless pattern, which are not surface defects, can be removed by generating the subtraction image I_diff of two two-dimensional images through subtraction processing by a differentiator 11.

Figure 11:
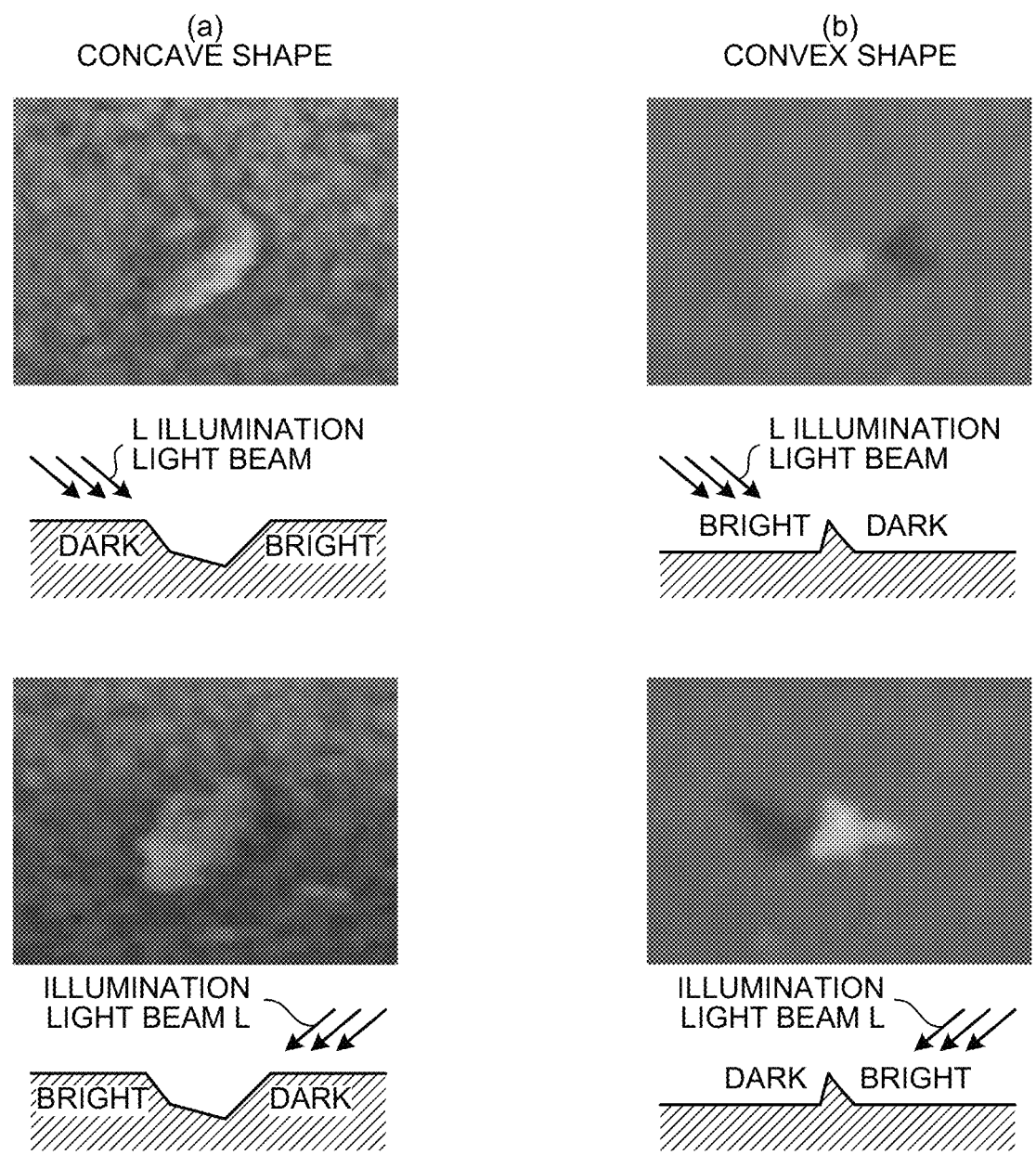
FIG. 11 is a diagram illustrating shade and shadow when light is incident from one side in cases in which the surface shape of an examination target part is concave and convex.

The following describes the logic of detection of a concave-convex surface-defect candidate portion from the subtraction image I_diff. FIGS. 11 (a) and (b) are diagrams illustrating shade and shadow when illumination light beam is emitted to the examination target part from one of the light sources when the surface shape of the examination target part is a concave shape and a convex shape, respectively. As illustrated in FIG. 11 (a), when the surface shape of the examination target part is a concave shape, the side closer to the light source is dark due to decrease of the quantity of irradiation light per unit area, and the side farther from the light source is bright due to approach to the direction of regular reflection. However, when the surface shape of the examination target part is a convex shape as illustrated in FIG. 11 (b), the side closer to the light source is bright due to approach to the direction of regular reflection, and the side farther from the light source is dark in the shadow of the convex shape.

Specifically, the bright-dark pattern of reflected light beams of illumination light beams differs, depending on whether the surface shape of the examination target part is a concave shape or a convex shape. Thus, the existence of a concave-convex surface-defect candidate portion can be detected by recognizing the bright-dark pattern of reflected light beam. Thus, next follows a description of a method of detecting a concave-convex surface-defect candidate portion by recognizing the bright-dark pattern of reflected light beam. Note that a concave surface-defect candidate portion in a concave-convex surface-defect candidate portion is detected in the following description, but a convex surface-defect candidate portion can be detected by the same logic. A bright portion in the following description means a blob having an area equal to or larger than a predetermined value and obtained by performing coupling processing on pixels having a luminance equal to or larger than a predetermined threshold value in the subtraction image I_diff. A dark portion in the following description means a blob having an area equal to or larger than a predetermined value and obtained by performing coupling processing on pixels having a luminance equal to or smaller than a predetermined threshold value in the subtraction image I_diff. A blob means a set of labeled pixels.

Note that the above-described predetermined threshold values for detecting bright and dark portions, and the above-described predetermined values for determining the areas are adjusted on consideration of net detection performance. In other words, as the predetermined threshold values and the predetermined values are set to be larger, only a defect having a stronger signal can be detected, but an excessive detection signal due to surface roughness and noise can be reduced. Thus, adjustment is preferably performed to satisfy target detection performance and an allowed excessive detection degree based on definition of a harmful defect, usage, and distinguishment performance of determining a defect from the bright-dark pattern.

Figure 12:
FIG. 12 is a diagram illustrating an exemplary subtraction image of a concave surface defect.

In the present embodiment, the bright-dark pattern is recognized by extracting adjacent bright and dark portions through threshold value processing. Specifically, in the surface-defect detecting apparatus 1 illustrated in FIG. 1, since the light sources 2a and 2b are symmetrically disposed in the right-left direction with respect to the normal vector of the examination target part, the bright-dark pattern of reflected light attributable to the concave-convex shape of the surface is generated in the right-left direction. The right-left direction of bright and dark portions is reserved depending on the order of subtraction processing, and thus in this example, a concave shape is defined to be a case in which the bright portion is on the right and the dark portion is on the left, and a convex shape is defined to be a case in which the dark portion is on the right and the bright portion is on the left. Thus, the subtraction image I_diff of a concave surface defect is as illustrated in FIG. 12. When images of the bright and dark portions are binarized with luminance threshold values "The" and "-The", respectively, binarized images I_bright and I_dark of the bright and dark portions are expressed by Expression (2) described below.

$$\left. \begin{array}{l} \text{I\_bright}(x, y) = 1 (\text{when I\_diff}(x, y) \geq \text{The}) \\ \text{I\_bright}(x, y) = 0 (\text{when I\_diff}(x, y) < \text{The}) \\ \text{I\_dark}(x, y) = 1 (\text{when I\_diff}(x, y) \leq -\text{The}) \\ \text{I\_dark}(x, y) = 0 (\text{when I\_diff}(x, y) > -\text{The}) \end{array} \right\} \quad (2)$$

After the images of the bright and dark portions are binarized in this manner and coupling and isolated-point removal are performed as necessary, the positional relation between adjacent bright and dark portions is calculated to detect the existence of a concave-convex surface defect. Note that various methods are available as the method of calculating the positional relation between adjacent bright and dark portions and three typical calculation methods are described below, but any other calculation method is applicable as long as the method can calculate the positional relation between bright and dark portions.

Figure 13:
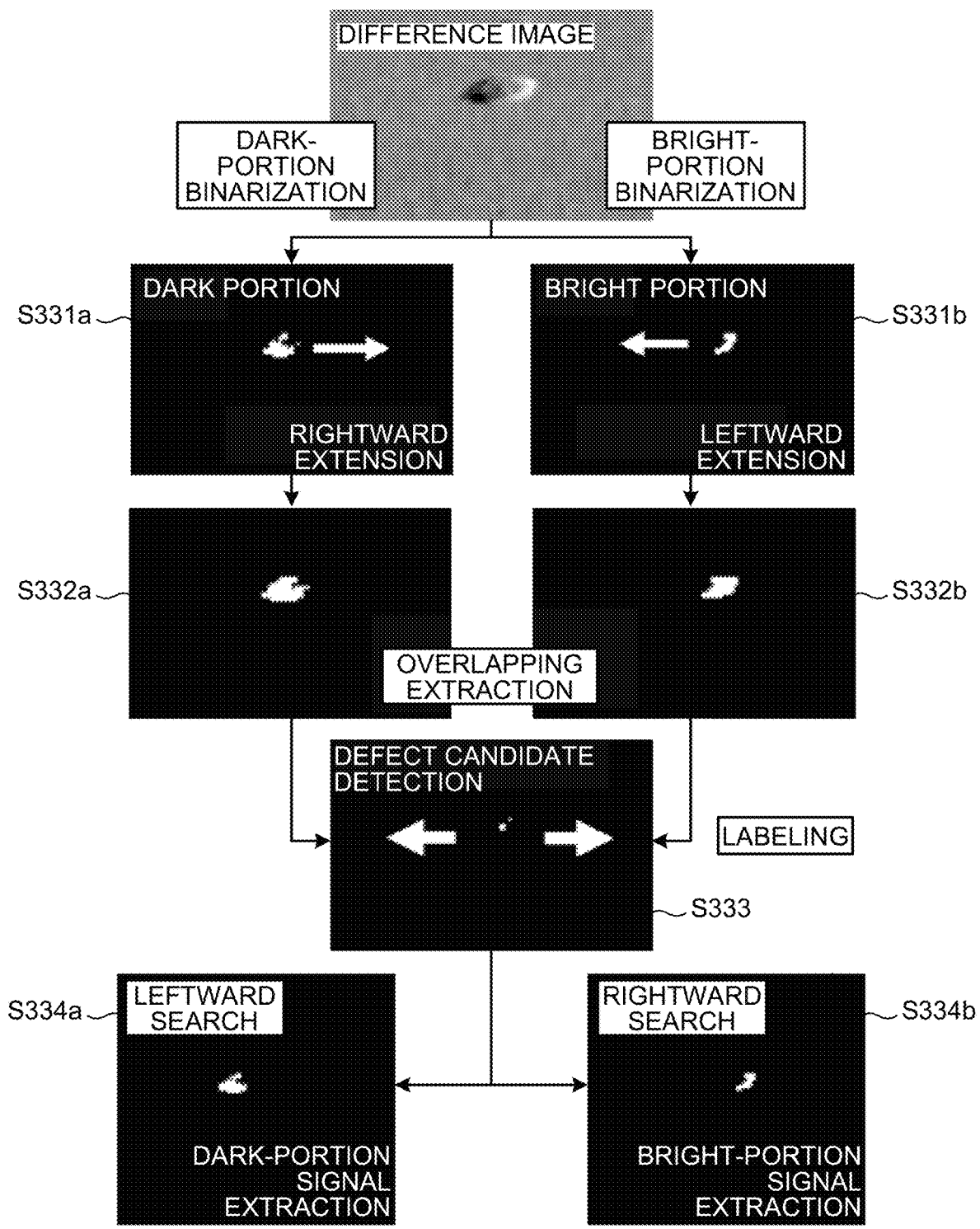
FIG. 13 is a flowchart illustrating the process of a method of calculating the positional relation between a bright portion and a dark portion by using expansion processing.

The first positional relation calculation method calculates the positional relation between adjacent bright and dark portions by performing, on the adjacent bright and dark portions, expansion-contraction processing in a specific direction. FIG. 13 illustrates a flowchart of the present calculation method. Since a concave surface defect is detected in the present embodiment, the following description is made on recognition of a bright-dark pattern in which the bright portion is on the right and the dark portion is on the left. Since the bright portion is on the right and the dark portion is on the left, the dark portion always exists on the left side of the bright portion, and the bright portion always exists on the right side of the dark portion. Thus, first in the present calculation method, the image processing device 5 performs rightward expansion processing on the dark portion and performs leftward expansion processing on the bright portion (steps S331a and S331b). When I_bright_extend and I_dark_extend represent images of the bright and dark portions, respectively, subjected to the extension processing and W represents the length of extension, the extension processing is expressed by Expression (3) described below. The origin is defined to be at the upper-left corner of each two-dimensional image, the positive y-axis direction is defined to be the downward direction, and the positive x-axis direction is defined to be the right direction.

$$I\_bright\_extend(x1, y) = 1 \quad x - W \leq x1 \leq x \text{(when } I\_bright(x, y) = 1\text{)}$$

$$I\_dark\_extend(x1, y) = 1 \quad x \leq x1 \leq x + W \text{(when } I\_dark(x, y) = 1\text{)} \tag{3}$$

Note that although the bright and dark portions are extended by the same length W in the present embodiment, the length W of extension does not necessarily need to be same, and extension processing may be performed on only one of the bright and dark portions in an extreme case. In addition, the length W of extension depends on the size of a surface defect to be detected.

Subsequently, the image processing device 5 performs AND processing on the images I_bright_extend and I_dark_extend of the bright and dark portions subjected to extension processing as in Expression (4) described below, thereby extracting, as a concave defect candidate portion image I_defect, an overlapping portion of the images I_bright_extend and I_dark_extend of the bright and dark portions subjected to extension processing (steps S332a and S332b).

$$I\_defect = I\_bright\_extend \, \& \, I\_dark\_extend \tag{4}$$

Subsequently, the image processing device 5 performs coupling and isolated-point removal processing on each obtained concave defect candidate portion image I_defect as necessary, and then performs labeling processing to generate a concave defect candidate blob I_defect_blob (step S333). Then, the image processing device 5 extracts the characteristic amount of each concave defect candidate blob I_defect_blob, and determines whether the concave defect candidate blob I_defect_blob is a concave surface defect based on a result of the extraction (steps S334a and S334b). Note that information of the bright and dark portions is needed to investigate the characteristic amount of the concave defect candidate blob I_defect_blob, and thus the bright and dark portions are restored from the concave defect candidate blob I_defect_blob.

Specifically, since the bright portion always exists on the right side of a concave defect candidate portion and the dark portion always exists on the left side thereof, the image processing device 5 searches the dark-portion binarized image I_dark to the left side with the barycenter of the concave defect candidate blob I_defect_blob as the starting point, and sets a blob found first as a dark-portion concave defect candidate blob I_dark_blob. Similarly, the image processing device 5 searches the bright-portion binarized image I_bright to the right with the barycenter of the concave defect candidate blob I_defect_blob as the starting point, and sets a blob found first as a bright-portion concave defect candidate blob I_bright_blob. Then, the image processing device 5 extracts a characteristic amount from the bright-portion concave defect candidate blob I_bright_blob and the dark-portion concave defect candidate blob I_dark_blob restored in this manner, and determines whether each concave defect candidate blob I_defect_blob is a concave surface defect based on the extracted characteristic amount. A specific characteristic amount differs depending on a defect, and thus is not described here but is described later in an example.

A concave-convex surface-defect candidate portion used in combined-bright-portion occupancy calculation to be described later can be calculated based on the restored bright-portion concave defect candidate blob and dark-portion concave defect candidate blob. Specifically, the concave-convex surface-defect candidate portion is calculated as a region obtained by calculating blobs of the bright and dark portions to acquire binarized images thereof and performing OR processing on the binarized images, or as a region obtained by further performing extension-contraction processing to fill a portion between the bright and dark portions. Note that although description is made on a concave defect candidate portion in the present embodiment for simplification of description, the bright-dark pattern is reversed for a convex defect candidate portion as illustrated in FIGS. 11 (*a*) and (*b*), and thus calculation can be performed through the same processing by reversing the positional relation between bright and dark portions in the processing illustrated in FIG. 13.

Figure 14:
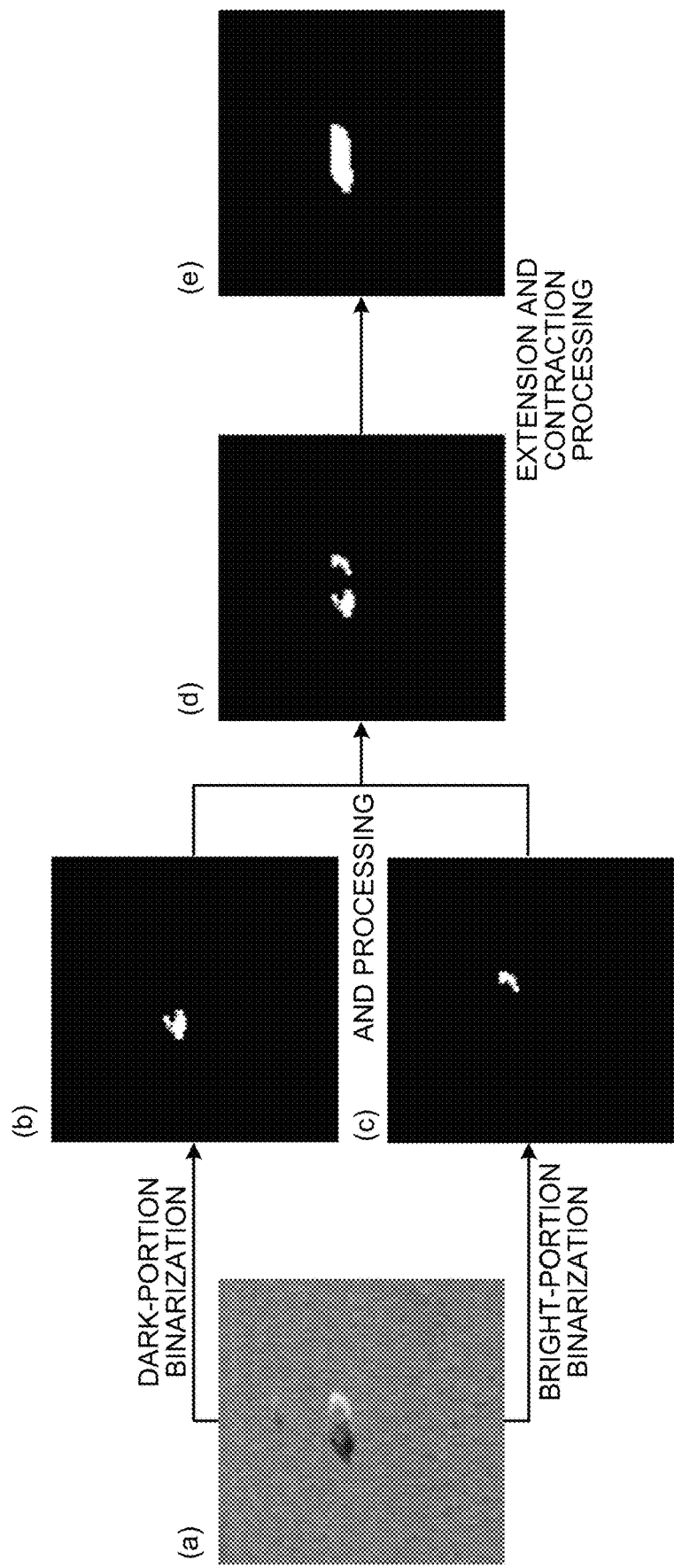
FIG. 14 is a diagram for describing expansion-contraction processing.

Note that, in the above-described extension-contraction processing, as illustrated in FIG. 14, extension processing with a certain shape (replacement of pixels forming an outline portion of the target blob by using a defined shape) is first performed on an image (FIG. 14 (*d*)) obtained through AND processing on a dark-portion binarized image (FIG. 14 (*b*)) and a bright-portion binarized image (FIG. 14 (*c*)) generated from a raw image (FIG. 14 (*a*)), and thereafter, contraction processing with a certain shape (deletion of pixels forming an outline portion of the target blob by using a defined shape) is performed to obtain an image (FIG. 14 (*e*)). As for an extension-contraction distance parameter, any shape is applicable as long as the blob is larger than the distance between the bright and dark portions, but the shape is desirably same between the extension processing and the contraction processing. The same result can be obtained by performing the extension-contraction processing a plurality of times for respective pixels.

In the second positional relation calculation method, after the above-described threshold value processing is performed and coupling and isolated-point removal processing is performed as necessary, bright and dark portions are extracted and labeling is performed to recognize the positional relation between adjacent bright and dark portions, thereby detecting a concave surface defect. Specifically, first, the image processing device 5 individually recognizes bright and dark portions through labeling and obtains barycenter information of the bright and dark portions. Subsequently, the image processing device 5 determines whether the barycenter of a dark portion exists in a predetermined range on the right side of each bright portion based on the barycenter information of the bright and dark portions. When the barycenter of a dark portion exists, the image processing device 5 recognizes the pair of bright and dark portions as a bright-dark pattern and performs characteristic amount analysis on the bright-dark pattern to determine whether the pair corresponds to a concave surface defect. Note that although the bright-dark pattern is recognized by using the barycenter information in this example, information used to recognize the bright-dark pattern does not necessarily need to be the barycenter information as long as the information is information (for example, an upper-end position or a lower-end position) with which the positions of the adjacent bright and dark portions can be understood. Note that although description is made on a concave defect candidate portion in the present embodiment for simplification of description, the bright-dark pattern is reversed for a convex defect candidate portion as illustrated in FIGS. 11 (*a*) and (*b*), and thus calculation can be performed through the same processing by reversing the positional relation between bright and dark portions in the processing illustrated in FIG. 13.

Figure 15:
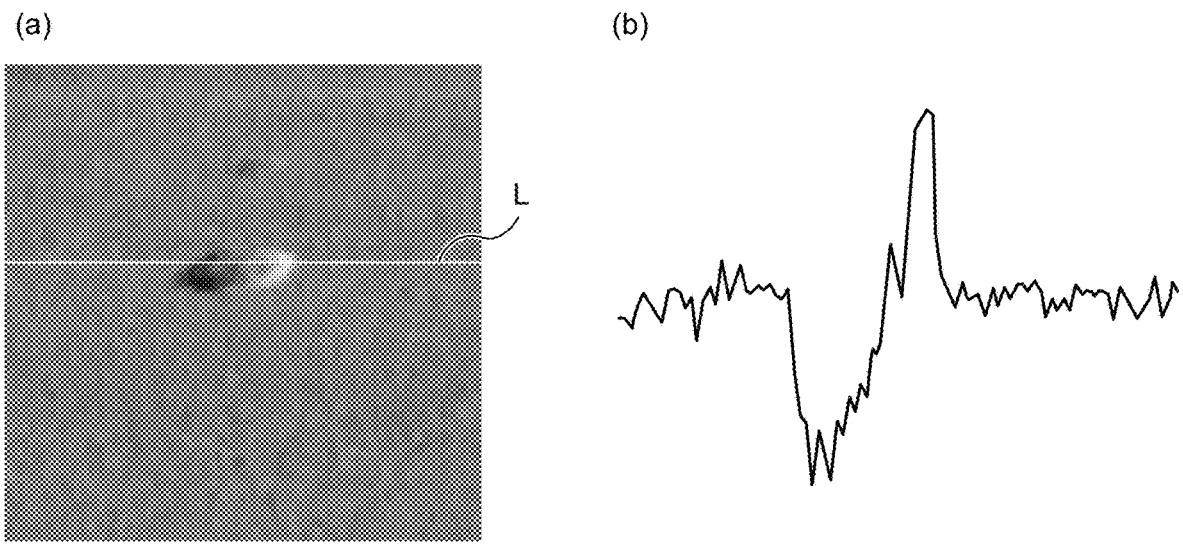
FIG. 15 is a diagram illustrating an exemplary subtraction image and an exemplary one-dimensional profile of a bright-dark pattern.

In the third positional relation calculation method, the above-described threshold value processing is not performed, and a concave surface defect is detected by recognizing a bright-dark pattern by using a filter. Specifically, in the surface-defect detecting apparatus 1 illustrated in FIG. 1, since the light sources 2a and 2b are symmetrically disposed in the right-left direction with respect to the normal of the examination target part, a bright-dark pattern attributable to concave and convex portions of the surface is generated in the right-left direction. FIGS. 15 (a) and (b) are a diagram illustrating an exemplary subtraction image and a diagram illustrating the one-dimensional profile of a bright-dark pattern along line segment L illustrated in FIG. 15 (a), respectively.

As illustrated in FIGS. 15 (a) and (b), since the bright portion is on the right and the dark portion is on the left in a concave surface defect, the one-dimensional profile of the bright-dark pattern is a characteristic one-dimensional profile having a mountain shape on the right side and a valley shape on the left side. Thus, in the present embodiment, a filter H for a mountain shape on the right side and a valley shape on the left side is produced in advance and applied to the subtraction image I_diff as indicated in Expression (5) below, thereby generating a two-dimensional image I_cont in which high-frequency noise is reduced and only the bright-dark pattern is enhanced.

$$I\_cont = H * I\_diff \quad (5)$$

Figure 16:
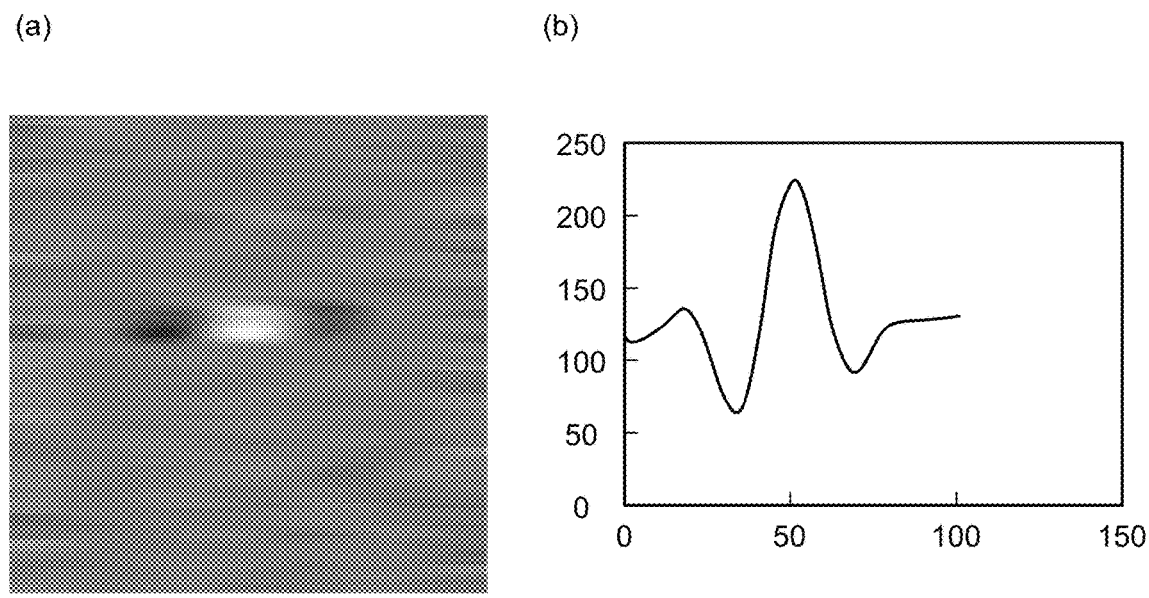
FIG. 16 is a diagram illustrating an exemplary two-dimensional image of a filter and an exemplary one-dimensional profile thereof.
Figure 17:
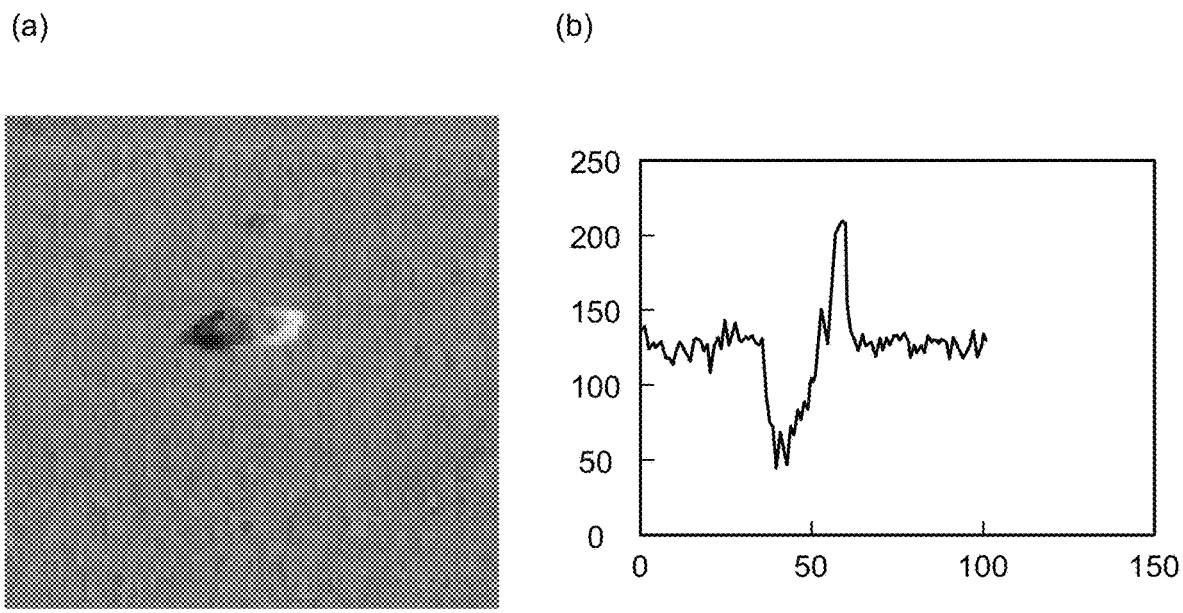
FIG. 17 is a diagram illustrating an exemplary subtraction image subjected to filter processing by using the filter illustrated in FIG. 16 and an exemplary one-dimensional profile thereof.

FIGS. 16 (a) and (b) are a diagram illustrating a two-dimensional image of the filter H produced in advance and a diagram illustrating an exemplary one-dimensional profile thereof in the right-left direction, respectively. FIGS. 17 (a) and (b) are a diagram illustrating a subtraction image subjected to filter processing using the filter H illustrated in FIGS. 16 (a) and (b) and a diagram illustrating the one-dimensional profile thereof in the right-left direction, respectively. As illustrated in FIGS. 17 (a) and (b), a two-dimensional image in which high-frequency noise is reduced and only the bright-dark pattern is enhanced is obtained. Note that although description is made on a concave defect candidate portion in the present embodiment for simplification of description, the bright-dark pattern is reversed for a convex defect candidate portion as illustrated in FIGS. 11 (a) and (b), and thus, calculation can be performed through the same processing by reversing the shape of the filter.

Note that several kinds of filters having ranges different from each other in a width direction may be prepared as necessary to support a large number of surface defect sizes. The image processing device 5 performs coupling and isolated-point removal processing as necessary on the two-dimensional image in which the bright-dark pattern is enhanced in this manner, and then performs threshold value processing to extract a defect candidate portion image I_defect. Then, the image processing device 5 detects a concave surface defect by performing, on the extracted defect candidate portion image I_defect, processing same as that of the first positional relation calculation method. Note that a scale or harmless pattern, which has the same appearance between two images before the subtraction and forms no bright-dark pattern after the subtraction, can be extracted by excluding a candidate portion that forms a bright-dark pattern after the subtraction from among concave-convex surface-defect candidate portions extracted by binarizing and labeling the images before the subtraction.

EXAMPLE

Figure 18:
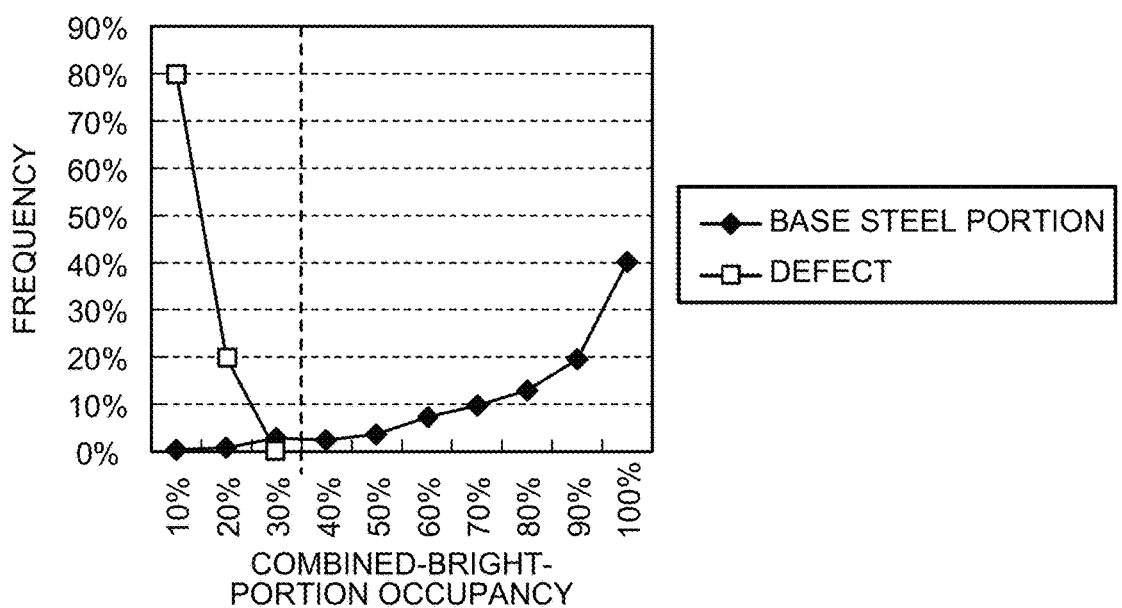
FIG. 18 is a diagram illustrating calculation results of combined-bright-portion occupancy histograms of a base steel portion and a concave-convex surface defect.

FIG. 18 illustrates an exemplary histogram of the combined-bright-portion occupancy calculated in an actual-machine test by using the surface-defect detecting method according to the fourth embodiment and a surface-defect detecting apparatus 1. In FIG. 18, the horizontal axis represents the combined-bright-portion occupancy in percentage, and the vertical axis represents the frequency of a base steel portion or a concave-convex surface defect in percentage. In FIG. 18, each black rhombus indicates how much 100% of places visually checked as a "base steel portion" are distributed to the corresponding combined-bright-portion occupancy. In FIG. 18, each white rectangle indicates how much 100% of places visually checked as a "concave-convex surface defect" are distributed to the corresponding combined-bright-portion occupancy. Note that in the present example, a bright portion was defined to be a portion having a luminance more than 1.5 times higher than that of a sound portion. A concave-convex surface-defect candidate portion was detected by using bright-dark pattern detection and extension-contraction processing.

As illustrated in FIG. 18, it can be checked that the concave-convex surface defect and the base steel portion are extremely well separated at a threshold value at which the combined-bright-portion occupancy is 30% approximately. In a case of an examination in which the base steel portion is excessively detected, a concave-convex surface-defect candidate portion having a combined-bright-portion occupancy of, for example, 30% or higher is determined as the base steel portion. With this method, 95% or more of the base steel portion can be removed without excluding the concave-convex surface defect at all. Note that the method of performing distinguishment by directly using the combined-bright-portion occupancy as the threshold value is effective, but the same result can be obtained through distinguishment using machine learning with the combined-bright-portion occupancy as one characteristic amount.

Fifth Embodiment

Lastly, a surface-defect detecting method as the fifth embodiment of the present invention will be described below with reference to FIG. 19.

The surface-defect detecting method as the fifth embodiment of the present invention includes an irradiation step, an image capturing step, and a detection step. In the irradiation step, the light sources 2a and 2b emit distinguishable illumination light beams L to a same examination target part on the surface of the steel pipe P in accordance with a trigger signal from the function generator 3. In the image capturing step, the area sensors 4a and 4b capture, in accordance with a trigger signal from the function generator 3, two-dimensional images formed by reflected light beams of the illumination light beams L emitted from the light sources 2a and 2b. In the detection step, the image processing device 5 distinguishes scale and/or harmless pattern, a concave-convex surface defect, and a base steel portion by using two two-dimensional images input from the area sensors 4a and 4b.

Figure 19:
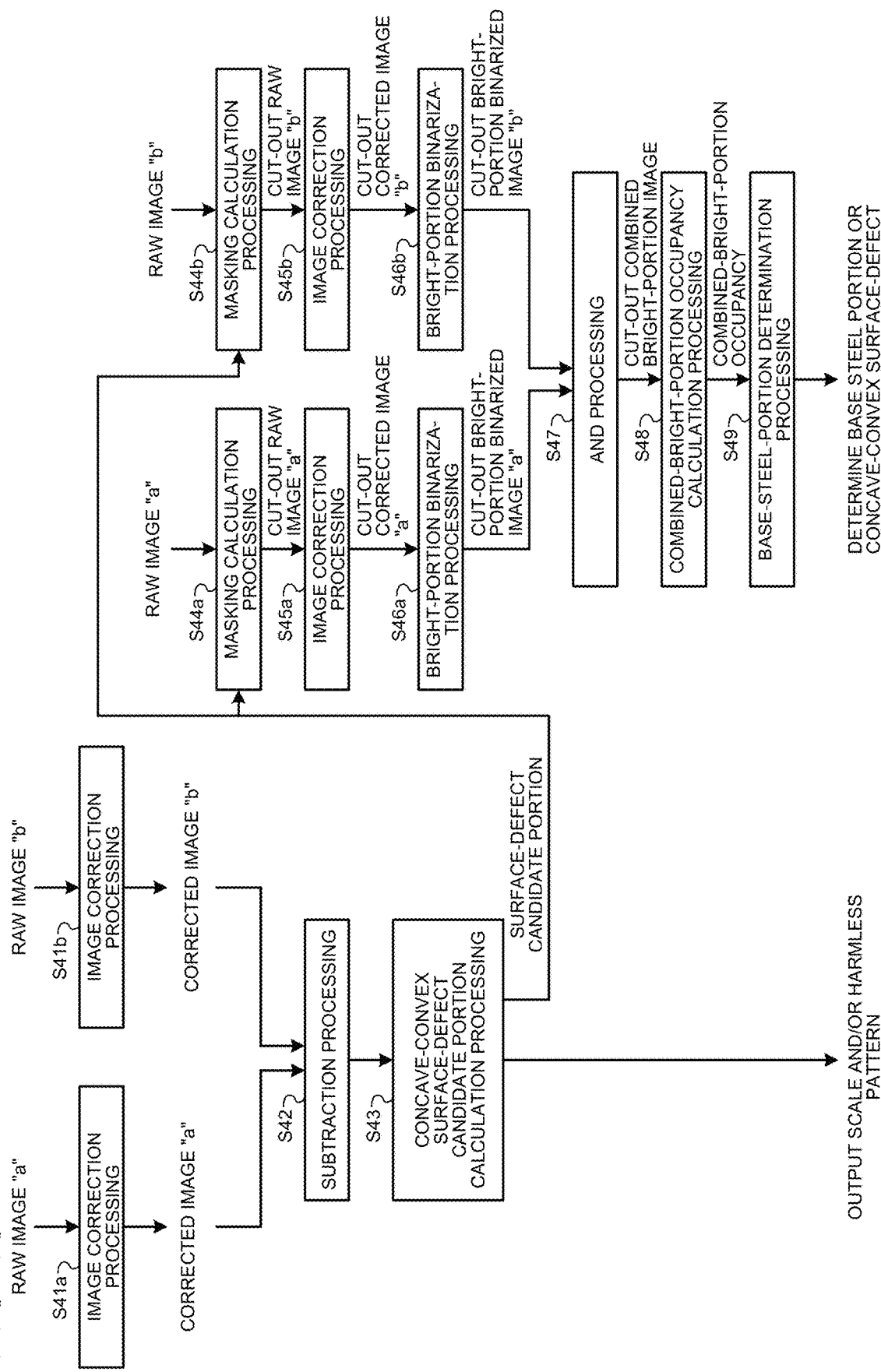
FIG. 19 is a flowchart illustrating the process of a detection step in a surface-defect detecting method as a fifth embodiment of the present invention.

FIG. 19 is a flowchart illustrating the process of the detection step in the surface-defect detecting method as the fifth embodiment of the present invention. As illustrated in FIG. 19, first in the detection step of the present embodiment, the image processing device 5 performs image correction processing, such as calibration, shading correction, and noise removal, using camera parameters derived in advance on each of two two-dimensional images (raw images "a" and "b") input from the area sensors 4a and 4b, thereby generating a correction image "a" and a correction image "b" (steps S41a and S41b). Subsequently, the image processing device 5 performs subtraction processing on the correction images "a" and "b", thereby generating a subtraction image (step S42). A concave-convex surface-defect candidate portion in the examination target part is calculated based on the generated subtraction image (step S43). Specifically, the image processing device 5 calculates a concave-convex surface-defect candidate portion in the examination target part based on the generated subtraction image and outputs information related to scale and/or harmless pattern removed through the subtraction processing.

Subsequently, the image processing device 5 performs, on each of two two-dimensional images (raw images "a" and "b") input from the area sensors 4a and 4b, masking calculation processing using the concave-convex surface-defect candidate portion calculated at the processing at step S43. Through this processing, the image processing device 5 generates a cut-out raw image "a" and a cut-out raw image "b" obtained by cutting out a target region of determination as a base steel portion (steps S44a and S44b). Subsequently, the image processing device 5 performs image correction processing on the cut-out raw images "a" and "b", thereby generating a cut-out correction image "a" and a cut-out correction image "b" (steps S45a and S45b).

Subsequently, the image processing device 5 performs, on each of the cut-out correction images "a" and "b", bright portion binarization processing of detecting a bright portion by setting one to the value of a pixel having a luminance equal to or higher than a threshold value and setting zero to the value of a pixel having a luminance lower than the threshold value. Through this processing, the image processing device 5 generates a cut-out bright-portion binarized image "a" and a cut-out bright-portion binarized image "b" (steps S46a and S46b). Subsequently, the image processing device 5 performs AND processing on the cut-out bright-portion binarized images "a" and "b". Through this processing, the image processing device 5 extracts a pixel having the value of one in both cut-out bright-portion binarized images "a" and "b", thereby generating a cut-out combined bright-portion image (step S47). Subsequently, the image processing device 5 calculates, as the combined-bright-portion occupancy, the ratio at which the cut-out combined bright-portion image occupies the entire concave-convex surface-defect candidate portion (step S48). In addition, the image processing device 5 determines whether the concave-convex surface-defect candidate portion is a base steel portion or a concave-convex surface defect through threshold value processing or the like using the calculated combined-bright-portion occupancy. When having determined that the concave-convex surface-defect candidate portion is not a base steel portion, the image processing device 5 determines that the concave-convex surface-defect candidate portion is a surface defect (step S49).

Note that a well-known method may be used as the method of detecting a concave-convex surface-defect candidate portion in the examination target part by using the subtraction image obtained through the processing at step S43. In particular, the methods disclosed in Patent Literatures 1 and 2 can eliminate scale and/or harmless pattern through subtraction processing and use a unique bright-dark pattern generated by a concave-convex surface defect, and thus have such an advantage that the methods can accurately detect a concave-convex surface-defect candidate portion, and accordingly, the methods are preferable. The above-described processing at step S33 may be exemplary processing at step S43.

Although each embodiment to which the invention achieved by the inventors is applied is described above, the present invention is not limited by description and drawings as parts of the disclosure of the present invention according to the present embodiment. For example, although the light sources 2a and 2b are symmetrically installed in the right-left direction and thus a bright-dark pattern in the right-left direction is recognized in the present embodiment, a concave-convex surface defect can be detected through the same processing when the installation positions of the light sources 2a and 2b are symmetric in the up-down direction instead of the right-left direction or are not symmetric. Specifically, when the light sources are symmetrically disposed in the up-down direction, the bright-dark pattern only changes from the right-left direction to the up-down direction, and thus a concave-convex surface defect can be detected through the same processing by rotating the bright-dark pattern by 90°.

Figure 20:
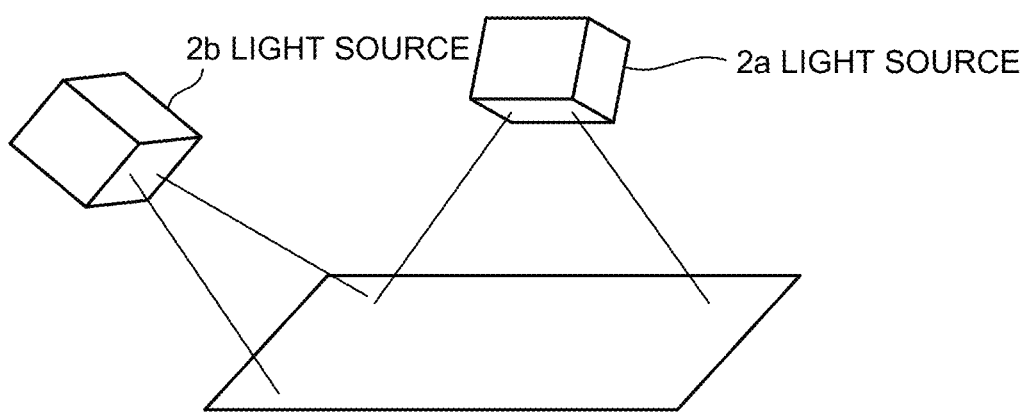
FIG. 20 is a schematic diagram illustrating a modification of the disposition positions of light sources.
Figure 22:
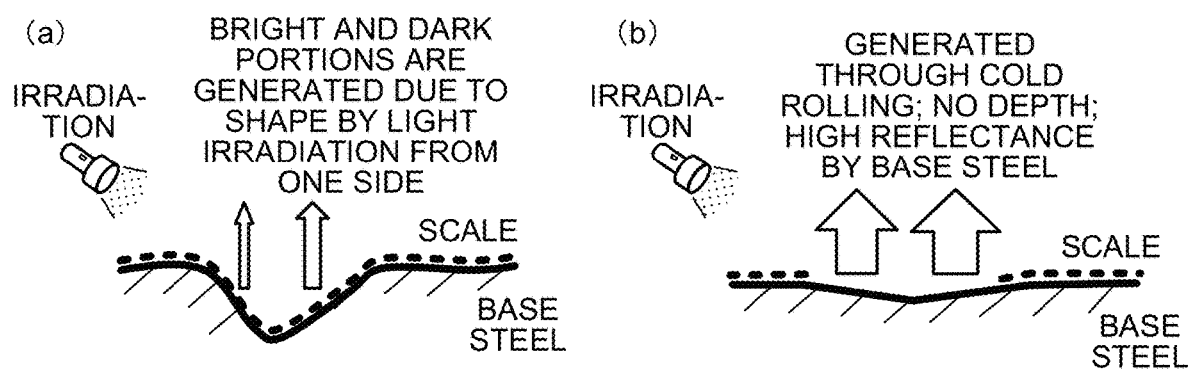
FIG. 22 is a schematic diagram for describing characteristics of a concave-convex surface defect and a base steel portion.

When the light sources 2a and 2b are installed so that the irradiation directions of illumination light beams are different from each other by 90° as illustrated in FIG. 20, the side closer to a light source is dark and the side farther from the light source is bright for a concave surface defect, or the side closer to the light source is bright and the side farther from the light source is dark for a convex surface defect. Specifically, in the case of a concave surface defect, a two-dimensional image obtained by illumination light beam from the light source 2a is as illustrated in FIG. 21 (a), and a two-dimensional image obtained by illumination light beam from the light source 2b is as illustrated in FIG. 21 (b). Accordingly, their subtraction image is a bright-dark pattern having contrast from the lower-left corner to the upper-right corner as illustrated in FIG. 21 (c). Thus, when the bright-dark pattern is rotated by 45°, the concave surface defect can be detected by a method same as that for a bright-dark pattern in the right-left direction. When three or more light sources are used, a subtraction image of a plurality of patterns can be obtained, and thus the accuracy of surface-defect detection can be further improved.

In the present embodiment, a concave-convex surface defect is detected when illumination light beams is irradiated in directions symmetric with respect to the normal of an examination target part, but the irradiation directions of illumination light beams do not necessarily need to be symmetric. The surface-defect detecting method of the present embodiment is applicable to any steel-material production line irrespective of hot rolling and cold rolling. When high-reflectance marking is applied to the product surface for product distinguishment, as well, only a marking portion can be detected by the same method. The marking has a unique shape in many cases, and thus can be distinguished by using a typical image characteristic amount.

When a steel material is manufactured while a surface defect of the steel material is detected by using the surface-defect detecting apparatus 1 or the surface-defect detecting method as an embodiment of the present invention, a base steel portion and a harmful surface defect can be accurately distinguished to improve the manufacturing yield of the steel material. For example, a cold-rolling scratch is one of most typical base steel portions in an iron steel process. A surface defect (concave-convex surface defect, in particular) is typically generated by pressing of a protrusion such as a roll during hot rolling, and a cold-rolling scratch is typically generated by surface rubbing during conveyance. Thus, when these defects can be distinguished and detected, a defect generation factor can be easily specified. As a result, a factor on a production line can be promptly removed to prevent further generation. The surface-defect detecting apparatus 1 as an embodiment of the present invention may be applied as an examination device included in a steel-material manufacturing facility. Specifically, a steel material manufactured by the manufacturing facility by using the surface-defect detecting apparatus according to the present invention is examined to detect a surface defect of the steel material. For the above-described reason in this case as well, a base steel portion and a harmful surface defect can be accurately distinguished to improve the manufacturing yield of the steel material.

The quality of a steel material can be managed by classifying the steel material based on the existence of a surface defect by using the surface-defect detecting apparatus 1 or the surface-defect detecting method as an embodiment of the present invention. In other words, a base steel portion and a harmful surface defect (concave-convex surface defect, in particular) can be accurately distinguished to improve the manufacturing yield of the steel material. For example, a cold-rolling scratch is one of most typical base steel portions in an iron steel process. When a concave-convex surface defect is harmful and a cold-rolling scratch is harmless, false sensing of the cold-rolling scratch leads to determination that a sound steel material has a defect, and reduces the manufacturing yield in some cases. When the degree of seriousness is different between a concave-convex surface defect and a cold-rolling scratch in this manner, distinguishment and detection of these defects allow determination in accordance with needs for examination of a steel material, thereby preventing decrease of the manufacturing yield of the steel material. In this manner, for example, other embodiments, examples, and applied technologies achieved by the skilled person in the art or the like based on the present embodiment are all included in the scope of the present invention.

INDUSTRIAL APPLICABILITY

According to the present invention, it is possible to provide a surface-defect detecting method, a surface-defect detecting apparatus, a surface-defect determination model generating method, and a surface-defect determination model that are capable of accurately distinguishing a base steel portion and a surface defect. In addition, according to the present invention, it is possible to provide a steel-material manufacturing method, a steel-material quality management method, and a steel-material manufacturing facility that are capable of improving a manufacturing yield of a steel material by accurately distinguishing a base steel portion and a surface defect.

REFERENCE SIGNS LIST

1 surface-defect detecting apparatus
2a, 2b light source
3 function generator
4a, 4b area sensor
5 image processing device
6 monitor
L illumination light beam
P steel pipe

The invention claimed is:

1. A surface-defect detecting method of optically detecting a surface defect of a steel material, the method comprising:
   irradiating an examination target part with illumination light beams from different directions by using two or more distinguishable light sources; and
   detecting a surface defect in the examination target part based on the degree of overlapping of bright portions extracted from two or more images formed by reflected light beams of the illumination light beams,
   wherein each image of the two or more images is from a same area of the steel material and the degree of overlapping of bright portions extracted from the two or more images is determined from the same area.

2. The surface-defect detecting method according to claim 1, wherein the degree of overlapping of the bright portions is a ratio at which an overlapping portion of the bright portions occupies a surface-defect candidate portion in the examination target part.

3. The surface-defect detecting method according to claim 2, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

4. The surface-defect detecting method according to claim 1, wherein the detecting the surface defect includes
   calculating a surface-defect candidate portion in the examination target part based on the bright portions extracted from two or more images formed by reflected light beams of the illumination light beams, and
   detecting a surface defect in the examination target part based on a ratio at which an overlapping portion of the bright portions occupies the surface-defect candidate portion.

5. The surface-defect detecting method according to claim 4, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

6. The surface-defect detecting method according to claim 1, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

7. The surface-defect detecting method according to claim 6, the surface-defect determination model being generated by the surface-defect determination model generating method, comprising:
   using the degree of overlapping of bright portions extracted from two or more images formed by reflected light beams of illumination light beams with which an examination target portion is irradiated from different directions by using two or more distinguishable light sources and a result of determination of whether or not a surface defect exists in the examination target portion, as teacher data; and
   generating a learning-completed model by machine learning as a surface-defect determination model, where an input value of the learning-completed model being the degree of overlapping of bright portions extracted from the two or more images and an output value of the learning-completed model being a value of determination of whether or not a surface defect exists in the examination target portion corresponding to the two or more images.

8. A surface-defect determination model generated by the surface-defect determination model generating method in the surface-defect detecting method according to claim 7.

9. A steel-material manufacturing method comprising a step of manufacturing a steel material while detecting a surface defect of the steel material by using a surface-defect detecting method of optically detecting the surface defect of the steel material, the surface-defect detecting method including:
irradiating an examination target part with illumination light beams from different directions by using two or more distinguishable light sources; and
detecting a surface defect in the examination target part based on the degree of overlapping of bright portions extracted from two or more images formed by reflected light beams of the illumination light beams,
wherein each image of the two or more images is from a same area of the steel material and the degree of overlapping of bright portions extracted from the two or more images is determined from the same area.

10. The steel-material manufacturing method according to claim 9, wherein the degree of overlapping of the bright portions is a ratio at which an overlapping portion of the bright portions occupies a surface-defect candidate portion in the examination target part.

11. The steel-material manufacturing method according to claim 10, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

12. The steel-material manufacturing method according to claim 9, wherein the detecting the surface defect includes
calculating a surface-defect candidate portion in the examination target part based on the bright portions extracted from two or more images formed by reflected light beams of the illumination light beams, and
detecting a surface defect in the examination target part based on a ratio at which an overlapping portion of the bright portions occupies the surface-defect candidate portion.

13. The steel-material manufacturing method according to claim 12, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

14. The steel-material manufacturing method according to claim 9, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

15. A steel-material quality management method comprising managing the quality of a steel material by classifying the steel material based on existence of a surface defect by using a surface-defect detecting method of optically detecting the surface defect of the steel material, the surface-defect detecting method including:
irradiating an examination target part with illumination light beams from different directions by using two or more distinguishable light sources; and
detecting a surface defect in the examination target part based on the degree of overlapping of bright portions extracted from two or more images formed by reflected light beams of the illumination light beams,
wherein each image of the two or more images is from a same area of the steel material and the degree of overlapping of bright portions extracted from the two or more images is determined from the same area.

16. The steel-material quality management method according to claim 15, wherein the degree of overlapping of the bright portions is a ratio at which an overlapping portion of the bright portions occupies a surface-defect candidate portion in the examination target part.

17. The steel-material quality management method according to claim 16, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

18. The steel-material quality management method according to claim 15, wherein the detecting the surface defect includes
calculating a surface-defect candidate portion in the examination target part based on the bright portions extracted from two or more images formed by reflected light beams of the illumination light beams, and
detecting a surface defect in the examination target part based on a ratio at which an overlapping portion of the bright portions occupies the surface-defect candidate portion.

19. The steel-material quality management method according to claim 18, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

20. The steel-material quality management method according to claim 15, wherein the detecting the surface defect includes detecting a surface defect in the examination target part by using a surface-defect determination model subjected to machine learning such that a determination value indicating whether or not the surface defect exists in the examination target part corresponding to the two or more images is output, when the degree of overlapping of bright portions extracted from the two or more images is input.

21. A surface-defect detecting apparatus configured to optically detect a surface defect of a steel material, the apparatus comprising:
two or more distinguishable light sources configured to irradiate an examination target part with illumination light beams from different directions; and an image processing device configured to detect a surface defect in the examination target part based on the degree of overlapping of bright portions extracted from two or more images formed by reflected light beams of the illumination light beams, wherein each image of the two or more images is from a same area of the steel material and the degree of overlapping of bright portions extracted from the two or more images is determined from the same area.

22. A steel-material manufacturing facility comprising:

a manufacturing facility configured to manufacture a steel material; and the surface-defect detecting apparatus according to claim 21 that is configured to examine the steel material manufactured by the manufacturing facility.

* * * * *